United States Patent
Chen et al.

(10) Patent No.: US 11,836,248 B2
(45) Date of Patent: *Dec. 5, 2023

(54) SYSTEM AND METHOD FOR OPERATING AN ENDPOINT AGENT AT AN ENDPOINT DEVICE

(71) Applicant: Forcepoint, LLC, Austin, TX (US)

(72) Inventors: Peidong Chen, San Jose, CA (US); Manikandan Thiagarajan, Cupertino, CA (US); Michael Miller, Boulder Creek, CA (US); Xin Hu, Pleasanton, CA (US)

(73) Assignee: Forcepoint LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/206,194

(22) Filed: Nov. 30, 2018

(65) Prior Publication Data

US 2020/0151328 A1 May 14, 2020

Related U.S. Application Data

(63) Continuation of application No. 16/189,472, filed on Nov. 13, 2018, now Pat. No. 10,885,186.

(51) Int. Cl.
*G06F 7/04* (2006.01)
*G06F 21/55* (2013.01)
*H04L 9/40* (2022.01)

(52) U.S. Cl.
CPC .......... *G06F 21/554* (2013.01); *G06F 21/552* (2013.01); *H04L 63/20* (2013.01); *G06F 2221/034* (2013.01)

(58) Field of Classification Search
CPC ............. G06F 2201/86; G06F 11/3089; G06F 21/554; G06F 21/552; G06F 2221/034;
(Continued)

(56) References Cited

U.S. PATENT DOCUMENTS 6,108,700 A 8/2000 Maccabee et al.
6,366,926 B1 * 4/2002 Pohlmann ............... G06F 9/542
(Continued)

OTHER PUBLICATIONS

Martin et al, A Model for Dynamic and Adaptable Services Management, May 19, 2009, IEEE, pp. 1-9. (Year: 2009).*
(Continued)

*Primary Examiner* — Philip J Chea
*Assistant Examiner* — Jenise E Jackson
(74) *Attorney, Agent, or Firm* — Terrile, Cannatti & Chambers; Stephen A. Terrile

(57) ABSTRACT

A method, system and computer-usable medium are disclosed for operating an endpoint agent at an endpoint device. Certain embodiments include a computer-implemented method for operating an endpoint agent at an endpoint device, including: operating the endpoint agent to selectively subscribe to events corresponding to activities occurring at an endpoint platform; processing events received from a message bus by the endpoint agent, where the events processed by the endpoint agent are events to which the endpoint agent has subscribed; and communicating, to a service, information corresponding to the events processed by the endpoint agent. Other embodiments of this aspect of the invention may include corresponding stand-alone and/or network computer systems, apparatus, and computer programs recorded on one or more computer storage devices, each configured to perform one or more of these actions.

20 Claims, 11 Drawing Sheets

(58) Field of Classification Search
CPC ........ G06F 21/565; G06F 21/44; G06F 21/50; H04L 63/0227; H04L 63/20; H04L 63/0245; H04L 63/10
USPC .......................................................... 726/1
See application file for complete search history.

(56) References Cited

U.S. PATENT DOCUMENTS

| | | | |
|---|---|---|---|
| 7,562,129 B1 | 7/2009 | Lee et al. | |
| 7,734,784 B1 * | 6/2010 | Araujo | H04W 4/50 709/250 |
| 8,863,297 B2 | 10/2014 | Sharma et al. | |
| 8,955,091 B2 | 2/2015 | Kailash et al. | |
| 9,081,940 B2 | 7/2015 | Trevor et al. | |
| 10,147,065 B1 | 12/2018 | Yiftachel et al. | |
| 10,169,575 B1 * | 1/2019 | Lototskiy | H04L 63/145 |
| 10,496,815 B1 | 12/2019 | Steiman et al. | |
| 2002/0104014 A1 | 8/2002 | Zobel et al. | |
| 2002/0156601 A1 * | 10/2002 | Tu | G06Q 10/10 702/188 |
| 2003/0093479 A1 * | 5/2003 | Mellen-Garnett | G06F 9/54 709/205 |
| 2003/0095503 A1 * | 5/2003 | Ha | H04Q 11/0478 370/232 |
| 2003/0105801 A1 | 6/2003 | Tse et al. | |
| 2005/0229183 A1 * | 10/2005 | Araujo | G06F 13/24 719/310 |
| 2007/0091827 A1 * | 4/2007 | Boers | H04L 45/16 370/255 |
| 2008/0086759 A1 | 4/2008 | Colson | |
| 2008/0288330 A1 | 11/2008 | Hildebrand et al. | |
| 2009/0177985 A1 * | 7/2009 | Mueller | G06Q 10/06 715/763 |
| 2009/0199264 A1 | 8/2009 | Lang | |
| 2010/0064341 A1 | 3/2010 | Aldera | |
| 2010/0111165 A1 * | 5/2010 | Kim | H04N 19/61 375/E7.078 |
| 2010/0169474 A1 | 7/2010 | Beckett, III et al. | |
| 2010/0212010 A1 | 8/2010 | Stringer et al. | |
| 2011/0225650 A1 | 9/2011 | Margolies et al. | |
| 2011/0246460 A1 * | 10/2011 | Hsieh | G06Q 30/02 707/736 |
| 2011/0246988 A1 * | 10/2011 | Hui | G06F 9/45558 718/1 |
| 2011/0307957 A1 | 12/2011 | Barcelo et al. | |
| 2013/0046987 A1 * | 2/2013 | Radhakrishnan | H04L 63/10 713/172 |
| 2013/0246605 A1 | 9/2013 | Mahadik et al. | |
| 2014/0007132 A1 | 1/2014 | Gaxiola et al. | |
| 2015/0074750 A1 | 3/2015 | Pearcy et al. | |
| 2015/0229624 A1 | 8/2015 | Grigg et al. | |
| 2015/0339477 A1 | 11/2015 | Abrams et al. | |
| 2016/0004862 A1 | 1/2016 | Almehmadi et al. | |
| 2016/0180078 A1 | 6/2016 | Chhabra et al. | |
| 2016/0205106 A1 | 7/2016 | Yacoub et al. | |
| 2016/0226911 A1 | 8/2016 | Boss et al. | |
| 2016/0232352 A1 | 8/2016 | Chen et al. | |
| 2016/0232353 A1 | 8/2016 | Gupta et al. | |
| 2016/0248797 A1 | 8/2016 | Yampolskiy et al. | |
| 2016/0286034 A1 * | 9/2016 | Iyer | H04W 12/08 |
| 2016/0321352 A1 | 11/2016 | Patel et al. | |
| 2016/0328562 A1 | 11/2016 | Saxena et al. | |
| 2016/0357778 A1 * | 12/2016 | MacKenzie | G06F 13/36 |
| 2017/0070506 A1 | 3/2017 | Reddy et al. | |
| 2017/0230417 A1 | 8/2017 | Amar et al. | |
| 2017/0286671 A1 | 10/2017 | Chari et al. | |
| 2017/0345073 A1 * | 11/2017 | Ferre | G06F 7/026 |
| 2018/0004948 A1 | 1/2018 | Martin et al. | |
| 2018/0027006 A1 | 1/2018 | Zimmermann et al. | |
| 2018/0084012 A1 | 3/2018 | Joseph et al. | |
| 2018/0124091 A1 | 5/2018 | Sweeney et al. | |
| 2018/0174161 A1 * | 6/2018 | You | G06Q 30/0201 |
| 2018/0218157 A1 | 8/2018 | Price et al. | |
| 2018/0302266 A1 | 10/2018 | Makovsky et al. | |
| 2018/0307833 A1 | 10/2018 | Noeth et al. | |
| 2018/0309795 A1 | 10/2018 | Ithal et al. | |
| 2018/0316684 A1 | 11/2018 | Desai et al. | |
| 2018/0337971 A1 | 11/2018 | Aleksandrov | |
| 2018/0341758 A1 | 11/2018 | Park et al. | |
| 2019/0066670 A1 | 2/2019 | White et al. | |
| 2019/0205533 A1 | 7/2019 | Diehl et al. | |
| 2019/0261203 A1 * | 8/2019 | Raleigh | H04L 41/0896 |
| 2019/0318128 A1 | 10/2019 | Ackerman et al. | |
| 2019/0332449 A1 * | 10/2019 | Adolfsson | G06F 9/542 |

OTHER PUBLICATIONS

Fernando et al, MAIA: An Event-Based Modular Architecture for Intelligent Agents, Aug. 14, 2014, IEEE, pp. 87-94. (Year: 2014).*
Goebel et al., Comparing Ingress and Egress Detection to Secure Interdomain Routing: An Experimental Analysis, Dec. 2011, ACM, vol. 11, No. 2, Article 5, pp. 5:1-5:26.
Papagiannapoulou et al., Concept-Based Image Clustering and Summarization of Event-Related Image Collections, Nov. 7, 2014, ACM, pp. 23-28.
Pramit Choudhary, Introduction to Anomaly Detection, Oracle Data Science, Feb. 15, 2017 https://blogs.oracle.com/datascience/introduction-to-anomaly-detection.
Anomaly, Detecting Anomalies with Moving Median Decomposition, Jan. 12, 2016 https://anomaly.io/anomaly-detection-moving-median-decomposition/.
NRCS, U.S. Department of Agriculture, Natural Resources Conservation Service, Media vs. Average to Describe Normal, downloaded Jul. 8, 2020, https://www.wcc.nrcs.usda.gov/normals/median_average.htm.
The Mitre Corporation, Mitre ATT&CK, Enterprise Matrix screenshot, Jul. 2, 2020, https://attack.mitre.org/matrices/enterprise/.
Du et al., Defense Deployment with Network Egress and Ingress Filtering, 2010, IEEE, pp. 1-6.
Manusankar et al., Intrusion Detection System with Packet Filtering for IP Spoofing, Dec. 29, 2010, IEEE pp. 563-567.
Lei et al., Context-Aware Unified Communication, Jan. 22, 2004, IEEE, pp. 1-11. (Year: 2004).
Sanchez De Rivera et al., Distributed Query Results and IoT Data in a Publish-Subscribe Network Implementing User Notifications, Mar. 25, 2016, IEEE, pp. 778-783. (Year: 2016).

* cited by examiner

SYSTEM AND METHOD FOR OPERATING AN ENDPOINT AGENT AT AN ENDPOINT DEVICE

CROSS-REFERENCE TO RELATED APPLICATIONS

The present application is a continuation application and claims priority to U.S. patent application Ser. No. 16/189,472, filed Nov. 13, 2018, titled "SYSTEM AND METHOD FOR OPERATING A PROTECTED ENDPOINT DEVICE," the entirety of which is hereby incorporated by reference.

BACKGROUND OF THE INVENTION

Field of the Invention

The present invention relates in general to the field of computers and similar technologies, and in particular to security system software utilized in this field. Still more particularly, it relates to a method, system and computer-usable medium for operating an endpoint agent at an endpoint device.

Description of the Related Art

Endpoint devices may be used to communicate with networks (e.g., LANs, the Internet, WANs, etc.) as well as with other endpoint devices. Users frequently interact with physical, system, data, and services resources of all kinds, as well as each other, on a daily basis using endpoint devices. Activities occurring at the endpoint devices, whether accidental or intended, pose some degree of security risk. Accordingly, it is desirable to monitor activities occurring at the endpoint devices that may compromise the security of the endpoint devices and/or the resources communicating with the endpoint devices.

SUMMARY OF THE INVENTION

A method, system and computer-usable medium are disclosed for operating an endpoint agent at an endpoint device. The system may include one or more computers that can be configured to perform particular operations or actions by virtue of having software, firmware, hardware, or a combination of them installed on the system that in operation causes or cause the system to perform the operation of the endpoint agent at the endpoint device. One or more computer programs can be configured to perform particular operations or actions by virtue if including instructions that, when executed by data processing apparatus, cause the apparatus to operate the endpoint agent at the endpoint device.

Certain embodiments include a computer-implemented method for operating an endpoint agent at an endpoint device, including: operating the endpoint agent to selectively subscribe to events corresponding to activities occurring at an endpoint platform; processing events received from a message bus by the endpoint agent, where the events processed by the endpoint agent are events to which the endpoint agent has subscribed; and communicating, to a service, information corresponding to the events processed by the endpoint agent. Other embodiments of this aspect of the invention may include corresponding stand-alone and/or network computer systems, apparatus, and computer programs recorded on one or more computer storage devices, each configured to perform one or more of these actions.

Certain embodiments include a system including: a processor; a data bus coupled to the processor; and a non-transitory, computer-readable storage medium embodying computer program code, the non-transitory, computer-readable storage medium being coupled to the data bus, the computer program code interacting with a plurality of computer operations and including instructions executable by the processor and configured for: operating an endpoint agent to selectively subscribe to events corresponding to activities occurring at an endpoint platform. The system also includes processing events received from a message bus by the endpoint agent, where the events processed by the endpoint agent are events to which the endpoint agent has subscribed. The system also includes communicating, to a service, information corresponding to the events processed by the endpoint agent. Other embodiments of this aspect of the invention may include corresponding stand-alone and/or network computer systems, apparatus, and computer programs recorded on one or more computer storage devices, each configured to perform one or more of these actions.

Certain embodiments include a non-transitory, computer-readable storage medium embodying computer program code, the computer program code including computer executable instructions configured for: operating an endpoint agent to selectively subscribe to events corresponding to activities occurring at an endpoint platform; processing events received from a message bus by the endpoint agent, where the events processed by the endpoint agent are events to which the endpoint agent has subscribed; and communicating, to a service, information corresponding to the events processed by the endpoint agent. Other embodiments of this aspect of the invention may include corresponding stand-alone and/or network computer systems, apparatus, and computer programs recorded on one or more computer storage devices, each configured to perform one or more of these actions.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
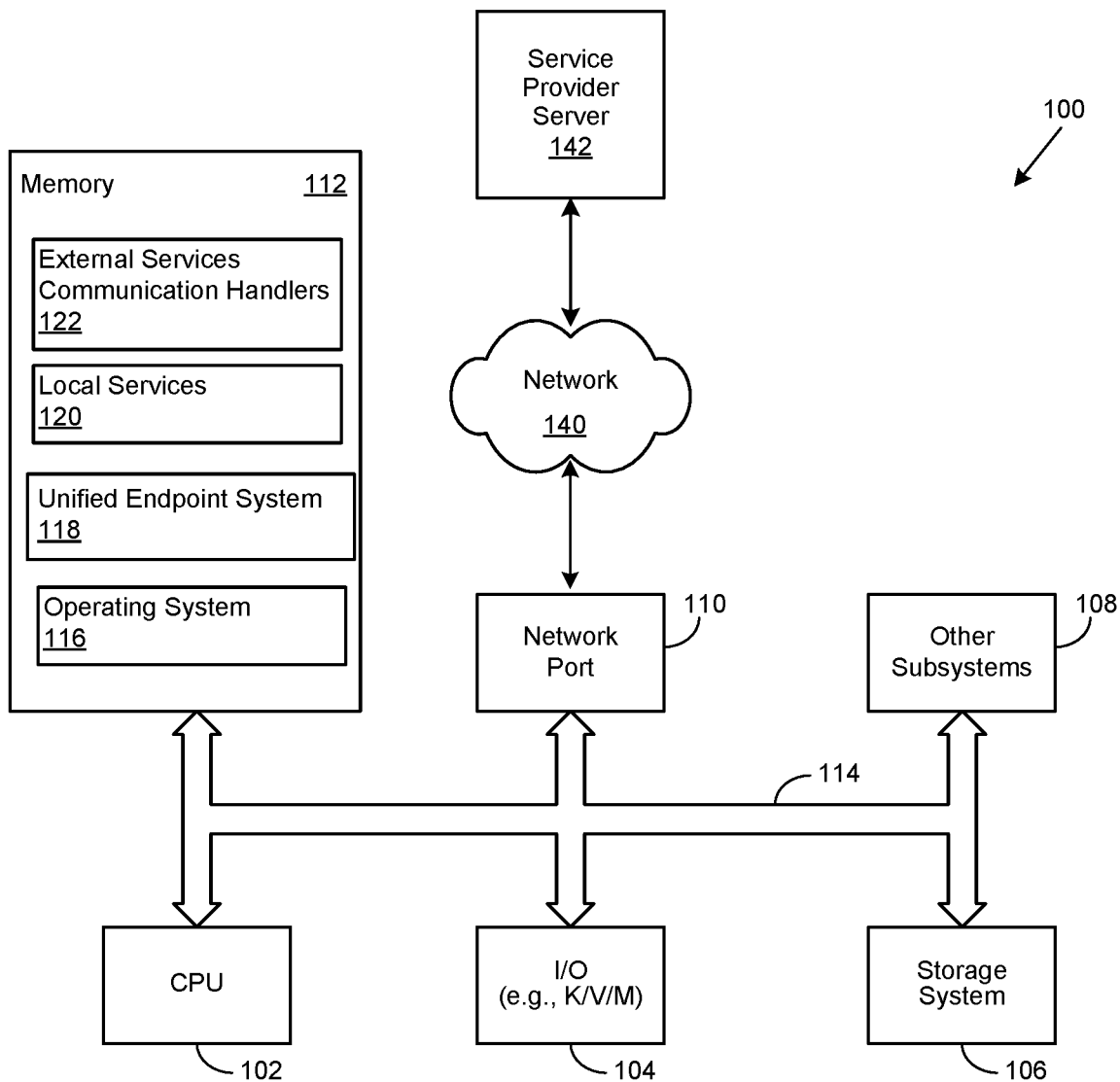
FIG. 1 is a generalized illustration of an endpoint device that can be used in the implementation of the disclosed protected endpoint system.

A method, system and computer-usable medium are disclosed for operating a protected endpoint. Certain aspects of the invention reflect an appreciation that the same activities occurring at the protected endpoint device may be analyzed from different perspectives. Certain aspects of the invention also reflect an appreciation that it may be desirable to select which activities occurring at the protected endpoint device are to be monitored. Certain aspects of the invention also reflect an appreciation that it may be desirable to selectively control events that are provided to various endpoint agents. Certain aspects of the invention also reflect an appreciation that may be desirable to easily add and remove certain services used with the endpoint device.

For the purposes of this disclosure, an endpoint device refers to an information processing system and broadly includes any device that is capable of storing, processing and communicating data. An information processing system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 is a generalized illustration of an endpoint device 100 that can be used in the implementation of the disclosed protected endpoint system. The endpoint device 100 includes a processor (e.g., central processor unit or "CPU") 102, input/output (I/O) devices 104, such as a display, a keyboard, a mouse, and associated controllers, a storage system 106, and various other subsystems 108. In various embodiments, the endpoint device 100 may be configured to interact with one or more devices such as, without limitation, USB sticks, wireless USB, memory cards, card readers, floppy drives, CD/DVD players and burners, digital cameras, smart phones, personal digital assistants (PDAs), MP3 players, external hard drives, portable hard drives, firewire devices, PCMCIA devices, Zip drives, biometric devices, etc.

In certain embodiments, the endpoint device 100 also includes network port 110 operable to connect to a network 140, which is likewise accessible by a service provider server 142. The endpoint device 100 likewise includes system memory 112, which is interconnected to the foregoing via one or more buses 114. System memory 112 further includes operating system (OS) 116 and in various embodiments may also include a unified endpoint system 118. In certain embodiments, the unified endpoint system 118 may interface with local security services 120 to provide a protected endpoint. In certain embodiments, the unified endpoint system 118 may interact with one or more external security services through external services communication handlers 122. In one embodiment, the endpoint device 100 is able to download the unified endpoint system 118 from the service provider server 142. In another embodiment, the unified endpoint system 118 is provided as a service from the service provider server 142.

In various embodiments, the unified endpoint system 118 provides a flexible platform to implement a protected endpoint. In certain embodiments, the overall configuration of an endpoint device 100 having the unified endpoint system 118 is readily configured to implement a protected endpoint having the desired security functionality. In certain embodiments, the configuration of the unified endpoint system 118 may be readily reconfigured to implement and/or remove security functionality. An endpoint risk assessment operation. In certain embodiments, the unified endpoint system 118 improves processor efficiency, and thus the efficiency of the endpoint device 100, by protecting the endpoint device 100 from security threats and/or detecting potential security vulnerabilities. As will be appreciated, once the endpoint device 100 is configured to implement the unified endpoint system 118, the endpoint device 100 becomes a specialized computing device specifically configured to perform endpoint security protection operations and is not a general purpose computing device. Moreover, the implementation of the unified endpoint system 118 on the endpoint device 100 improves the functionality of the endpoint device 100 and provides a useful and concrete result of security protection for the endpoint device.

Figure 2:
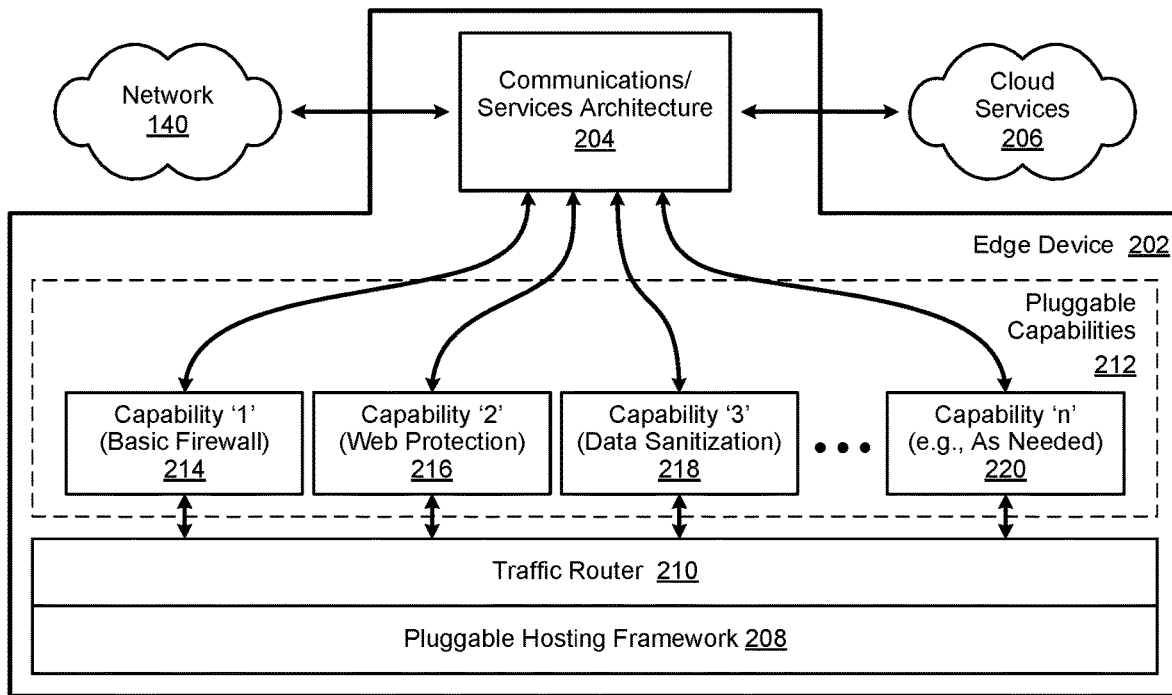
FIG. 2 is a simplified block diagram of an edge device that may be used for communications between the endpoint device and a network.

FIG. 2 is a simplified block diagram of an edge device that may be used for communications between the endpoint device 100 and a network. As used herein, an edge device, such as the edge device 202 shown in FIG. 2, broadly refers to a device providing an entry point into a network 140. Examples of such edge devices 202 may include routers, routing switches, integrated access devices (IADs), multiplexers, wide-area network (WAN) access devices, and network security appliances. In certain embodiments, the network 140 may be a private network (e.g., an enterprise network), a semi-public network (e.g., a service provider core network), or a public network (e.g., the Internet).

Skilled practitioners of the art will be aware that edge devices 202 are often implemented as routers that provide authenticated access to faster, more efficient backbone and core networks. Furthermore, current industry trends include making edge devices 202 more intelligent, which allows core devices to operate at higher speed as they are not burdened with additional administrative overhead. Accordingly, such edge devices 202 often include Quality of Service (QoS) and multi-service functions to manage different types of traffic. Consequently, it is common to design core networks with switches that use routing protocols such as Open Shortest Path First (OSPF) or Multiprotocol Label Switching (MPLS) for reliability and scalability. Such approaches allow edge devices 202 to have redundant links to the core network, which not only provides improved reliability, but enables enhanced, flexible, and scalable security capabilities as well.

In certain embodiments, the edge device 202 may be implemented to include a communications/services architecture 204, various pluggable capabilities 212, a traffic router 210, and a pluggable hosting framework 208. In certain embodiments, the communications/services architecture may be implemented to provide access to and from various networks 140, cloud services 206, or a combination thereof. In certain embodiments, the cloud services 206 may be provided by a cloud infrastructure familiar to those of skill in the art. In certain embodiments, the edge device 202 may be implemented to provide support for a variety of generic services, such as directory integration, logging interfaces, update services, and bidirectional risk/context flows associated with various analytics. In certain embodiments, the edge device 202 may be implemented to provide temporal information, described in greater detail herein, associated with the provision of such services.

In certain embodiments, the edge device 202 may be implemented as a generic device configured to host various network communications, data processing, and security management capabilities. In certain embodiments, the pluggable hosting framework 208 may be implemented to host such capabilities in the form of pluggable capabilities 212. In certain embodiments, the pluggable capabilities 212 may include capability '1' 214 (e.g., basic firewall), capability '2' 216 (e.g., general web protection), capability '3' 218 (e.g., data sanitization), and so forth through capability 'n' 220, which may include capabilities needed for a particular operation, process, or requirement on an as-needed basis.

In certain embodiments, the pluggable capabilities 212 may be sourced from various cloud services 206. In certain embodiments, the pluggable hosting framework 208 may be implemented to provide certain computing and communication infrastructure components, and foundation capabilities, required by one or more of the pluggable capabilities 212. In certain embodiments, the pluggable hosting framework 208 may be implemented to allow the pluggable capabilities 212 to be dynamically invoked. Skilled practitioners of the art will recognize that many such embodiments are possible. Accordingly, the foregoing is not intended to limit the spirit, scope or intent of the disclosure.

Figure 3:
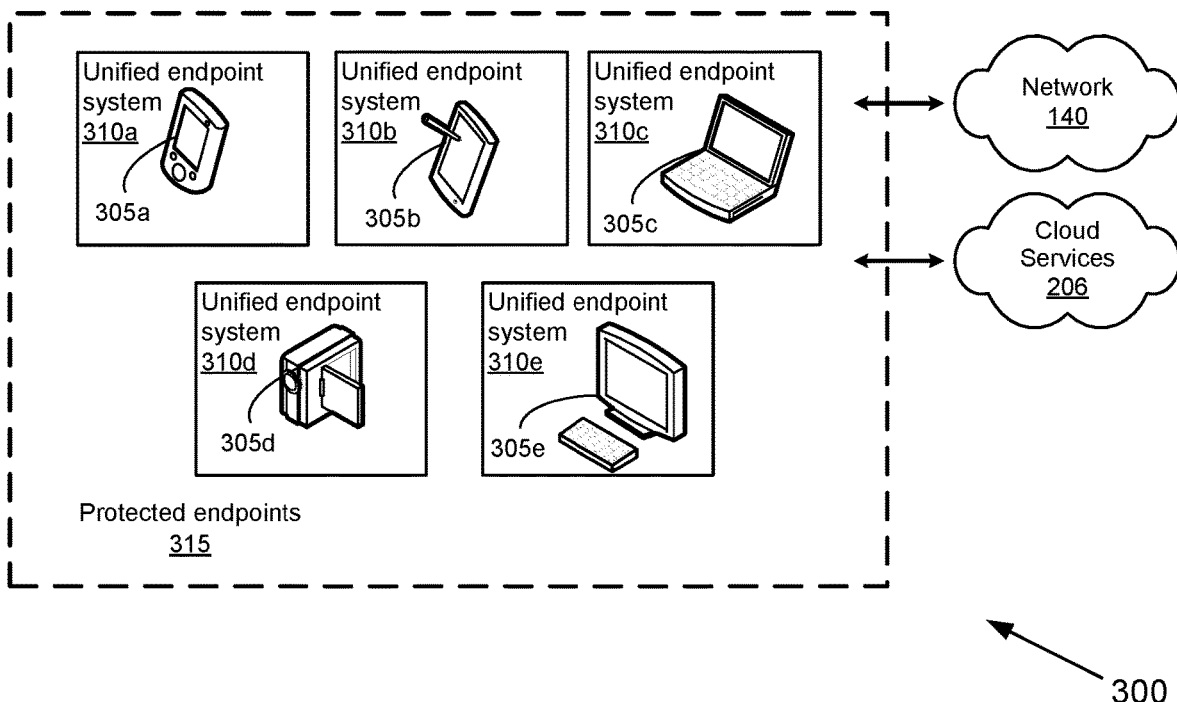
FIG. 3 is a simplified block diagram of an electronic environment 300 in which certain embodiments of the disclosed system may operate.

FIG. 3 is a simplified block diagram of an electronic environment 300 in which certain embodiments of the disclosed system may operate. In certain embodiments, the electronic environment 300 includes a plurality of endpoint devices 305a-305e each operating in the context of a respective unified endpoint system 310a-310e to implement a plurality of protected endpoints, shown generally at 315. As used herein, a protected endpoint is an endpoint device that includes internal security services and/or cooperates with external security services to implement various security functions such as, for example, without limitation, data loss prevention, data theft prevention, virus protection, malware protection, spyware protection, unauthorized and/or unsecured data transfers to and from other endpoint devices, etc. In certain embodiments, the protected endpoints 315 implement a policy-based approach to network security that may use the endpoint devices 305 to comply with particular criteria before they are granted access to network resources. As an example, a given endpoint device 305 may be required to have a particular operating system (OS), or version thereof, a Virtual Private Network (VPN) client, anti-virus software with current updates, and so forth. In various embodiments, the protected endpoint 302 may be implemented to perform operations associated with the detection of anomalous, abnormal, unexpected or malicious user behavior. In various embodiments, the protected endpoints 315 may be implemented to collect and provide certain information associated with an event, described in greater detail herein. In certain embodiments, the protected endpoint 302 may be implemented to provide temporal information, such as timestamp information, associated with such operations.

In certain embodiments, the protected endpoints 315 may include personal computers, laptop computers, tablet computers, personal digital assistants (PDAs), smart phones, mobile telephones, digital cameras, video cameras, or other devices that are capable of storing, processing and communicating data. In certain embodiments, one or more of the protected endpoints 315 may communicate with electronic resources over network 140, cloud services 206, etc. In certain embodiments, the communication of the data may take place in real-time or near-real-time. As used herein, real-time broadly refers to processing and providing information within a time interval brief enough to not be discernable by a user. As an example, a cellular phone conversation may be used to communicate information in real-time, while an instant message (IM) exchange may be used to communicate information in near real-time. In certain embodiments, the communication of the information may take place asynchronously. For example, an email message may be stored on an endpoint device 305 when it is offline. In this example, the information may be communicated to its intended recipient once the endpoint device 305 gains access to a network 140.

Figure 4:
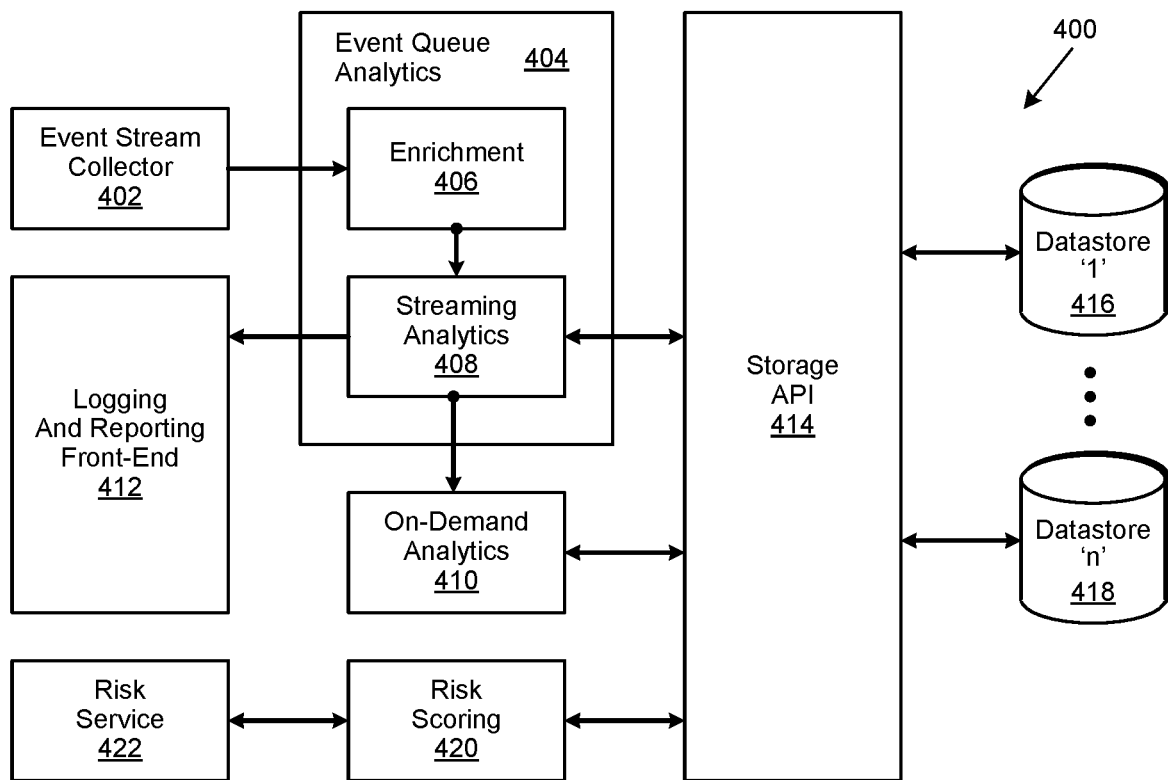
FIG. 4 is a simplified block diagram of an exemplary security analytics system that may be implemented by security services within a protected endpoint and/or security services in communication with the protected endpoint.

FIG. 4 is a simplified block diagram of an exemplary security analytics system 400 that may be implemented by security services within a protected endpoint and/or security services in communication with the protected endpoint. In certain embodiments, the security analytics system 400 may be implemented to be scalable. In certain embodiments, the security analytics system 400 may be implemented in a centralized location, such as a corporate data center. In these embodiments, additional resources may be added to the security analytics system 400 as needs grow. In certain embodiments, the security analytics system 400 may be implemented as a distributed system. In these embodiments, the security analytics system 400 may span multiple information processing systems. In certain embodiments, the security analytics system 400 may be implemented in a cloud environment. In certain embodiments, the security analytics system 400 be implemented in a virtual machine (VM) environment. In such embodiments, the VM environment may be configured to dynamically and seamlessly scale the security analytics system 400 as needed. Skilled practitioners of the art will recognize that many such embodiments are possible. Accordingly, the foregoing is not intended to limit the spirit, scope or intent of the invention.

In certain embodiments, the security analytics system 400 shown in FIG. 4 may include an event queue analytics 404 module, described in greater detail herein. In certain embodiments, the event queue analytics 404 sub-system may be implemented to include an enrichment module 406 and a streaming analytics 408 module. In certain embodiments, the security analytics system 400 may be implemented to provide log storage, reporting, and analytics capable of performing streaming 408 and on-demand 410 analytics operations. In certain embodiments, such operations may be associated with defining and managing a user profile, detecting anomalous, abnormal, unexpected or malicious user behavior, adaptively responding to mitigate risk, or a combination thereof, as described in greater detail herein.

In certain embodiments, the security analytics system 400 may be implemented to provide a uniform platform for storing events and contextual information associated with various user behaviors and performing longitudinal analytics. As used herein, longitudinal analytics broadly refers to performing analytics of user behaviors occurring over a particular period of time. As an example, a user may iteratively attempt to access certain proprietary information stored in various locations. In addition, the attempts may occur over a brief period of time. To continue the example, the fact that the information the user is attempting to access is proprietary, that it is stored in various locations, and the attempts are occurring in a brief period of time, in combination, may indicate the user behavior enacted by the user is suspicious. As another example, certain entity identifier information (e.g., a user name) associated with a user may change over time. In this example, the change in user name, during a particular period of time or at a particular point in time, may represent suspicious user behavior.

In certain embodiments, an event stream collector 402 may be implemented to collect event and related contextual information associated with potential security threats, security vulnerabilities, and/or various user behaviors. In these embodiments, the method by which the event and contextual information is selected to be collected by the event stream collector 402 is a matter of design choice. In certain embodiments, the event and contextual information collected by the event stream collector 402 may be processed by an enrichment module 406 to generate enriched user behavior information. In certain embodiments, the enrichment may include certain contextual information related to a particular user behavior or event. In certain embodiments, the enrichment may include certain temporal information, such as timestamp information, related to a particular user behavior or event.

In certain embodiments, enriched user behavior information may be provided by the enrichment module 406 to a streaming 408 analytics module. In turn, the streaming 408 analytics module may provide some or all of the enriched user behavior information to an on-demand 410 analytics module. As used herein, streaming 408 analytics broadly refers to analytics performed in near real-time on enriched user behavior information as it is received. Likewise, on-demand 410 analytics broadly refers herein to analytics performed, as they are requested, on enriched user behavior information after it has been received. In certain embodiments, the enriched user behavior information may be associated with a particular event. In certain embodiments, the enrichment module 406 and streaming analytics 408 modules may be implemented to perform event queue analytics 404 operations.

In certain embodiments, the on-demand 410 analytics may be performed on enriched user behavior associated with a particular interval of, or point in, time. In certain embodiments, the streaming 408 or on-demand 410 analytics may be performed on enriched user behavior associated with a particular user, group of users, one or more entities, or a combination thereof. In certain embodiments, the streaming 408 or on-demand 410 analytics may be performed on enriched user behavior associated with a particular resource, such as a facility, system, datastore, or service. Those of skill in the art will recognize that many such embodiments are possible. Accordingly, the foregoing is not intended to limit the spirit, scope or intent of the invention.

In certain embodiments, the results of various analytics operations performed by the streaming 408 or on-demand 410 analytics modules may be provided to a storage Application Program Interface (API) 414. In turn, the storage API 412 may be implemented to provide access to various datastores '1' 416 through 'n' 418, which in turn are used to store the results of the analytics operations. In certain embodiments, the unified endpoint system 118 may be implemented with a logging and reporting front-end, which is used to receive the results of analytics operations performed by the streaming analytics module 408. In certain embodiments, the datastores '1' 416 through 'n' 418 may variously include a datastore of entity identifiers, temporal events, or a combination thereof.

In certain embodiments, the security analytics system 400 may include a risk scoring 420 module implemented to perform risk scoring operations. In certain embodiments, functionalities of the risk scoring 420 module may be provided in the form of a risk management service 422. In certain embodiments, the risk management service 422 may be implemented to perform operations associated with defining and managing a user profile In certain embodiments, the risk management service 422 may be implemented to perform operations associated with detecting anomalous, abnormal, unexpected or malicious user behavior and/or security threats and responding to mitigate risk. In certain embodiments, the risk management service 422 may be implemented to provide the results of various analytics operations performed by the streaming 406 or on-demand 408 analytics modules. In certain embodiments, the risk management service 422 may be implemented to use the storage API 412 to access various enhanced cyber behavior and analytics information stored on the datastores '1' 414 through 'n' 416. Skilled practitioners of the art will recognize that many such embodiments are possible. Accordingly, the foregoing is not intended to limit the spirit, scope or intent of the invention.

Figure 5:
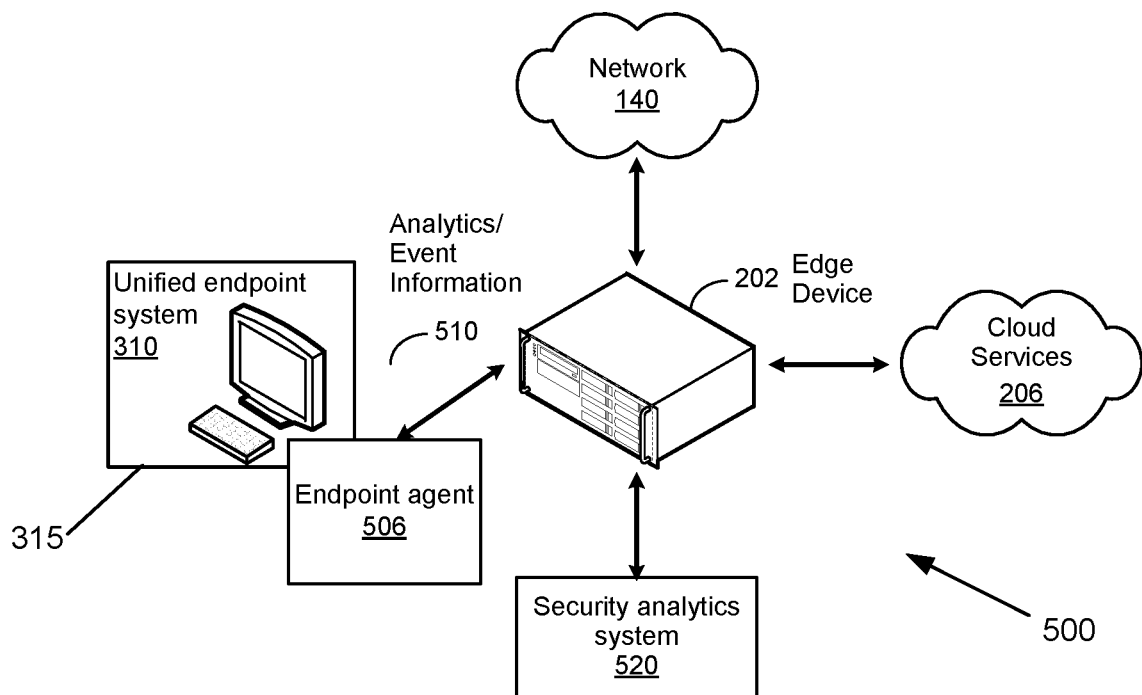
FIG. 5 is a simplified block diagram of one example of an electronic environment in which certain embodiments of a protected endpoint may be implemented.

FIG. 5 is a simplified block diagram of one example of an electronic environment 500 in which certain embodiments of a protected endpoint 315 may be implemented. In certain embodiments, endpoint devices operate in the context of individual unified endpoint systems 310 to implement a protected endpoint 315. In certain embodiments, the protected endpoint 315 includes one or more endpoint agents 506 that communicate information relating to activities occurring at the protected endpoint 315 in corresponding analytics/event information 510 to one or more edge devices 202. In certain embodiments, analytics/event information 510 may be communicated from the edge device 202 to security analytics system 520 for processing. In certain embodiments, the edge device 202 also provides communication between the protected endpoint 315 and network 140 and/or cloud services 206. In certain embodiments, communication between the protected endpoint 315, network 140, and/or cloud services 206 may be controlled by the security analytics system 520 to prevent security-related attacks and/or breaches.

In certain embodiments, the security analytics system 520 may be implemented to perform operations associated with detecting anomalous, abnormal, unexpected or malicious user behavior and responding to mitigate risk. In certain embodiments, the security analytics system 520 may be implemented in combination with one or more endpoint agents (discussed in further detail herein), one or more edge devices 202, various cloud services 206, and a network 140 to perform such operations. In certain embodiments, certain functional aspects of the security analytics system 520 may be implemented within the protected endpoints 315 such that event information associated with activities within a protected endpoint is communicated to security analytics system 520 operating at a server side of a network.

In certain embodiments, the network edge device 202 may be implemented in a bridge, a firewall, or a passive monitoring configuration. In certain embodiments, the edge device 202 may be implemented as software running on an information processing system. In certain embodiments, the network edge device 202 may be implemented to provide integrated logging, updating and control. In certain embodiments, the edge device 202 may be implemented to receive network requests and cyber activity information, such as user behaviors, threat detection, etc., in the form of analytics/event information 510 from the protected endpoints 315.

In certain embodiments, the edge device 202 may be implemented to receive enriched user behavior information in the analytics/event information 510 from the endpoint agent 506 of the protected endpoint 315. It will be appreciated that such enriched user behavior information may not be available for provision to the edge device 202 when a protected endpoint 315 is not implemented with a corresponding endpoint agent 506 having user behavior security functions. However, it will be recognized that the advantages associated with the disclosed embodiments are achievable without the presence of user behavior information in the analytics/event information 510.

In certain embodiments, a given user behavior may be enriched by an associated endpoint agent 506 attaching contextual information to a request. In certain embodiments, the context is embedded within a network request, which is then provided as enriched user behavior information in the analytics/event information 510. In certain embodiments, the contextual information may be concatenated, or appended, to a request, which in turn may be provided as enriched user behavior information in the analytics/event information 510. In these embodiments, the enriched user behavior information may be unpacked upon receipt and parsed to separate the request and its associated contextual information.

In certain embodiments, new flow requests may be accompanied by a contextual information packet sent to the edge device 202. In these embodiments, the new flow requests may be provided as enriched user behavior information in the analytics/event information 510. In certain embodiments, an endpoint agent operating at a protected endpoint 315 may also send updated contextual information to the edge device 202 once it becomes available. As an example, an endpoint agent may share a list of files that have been read by a current process at any point in time once the information has been collected. To continue the example, such a list of files may be used to determine which data the endpoint agent may be attempting to exfiltrate.

In certain embodiments, point analytics processes executing on the edge device 202 may request a particular service. As an example, risk scores associated with a particular event on a per-user basis may be requested. In certain embodiments, the service may be requested from the security analytics system 520. In certain embodiments, the service may be requested from various cloud services 206.

In certain embodiments, contextual information associated with a particular user behavior may be attached to various network service requests. In certain embodiments, the request may be wrapped and then handled by proxy. In certain embodiments, a small packet of contextual information associated with a user behavior may be sent with a service request. In certain embodiments, service requests may be related to Domain Name Service (DNS), web browsing activity, email, and so forth, all of which are essentially requests for service by a protected endpoint 315. In certain embodiments, such service requests may be associated with temporal event information, described in greater detail herein. Consequently, such requests can be enriched by the addition of user behavior contextual information (e.g., UserAccount, interactive/automated, data-touched, temporal event information, etc.). Accordingly, the edge device 202 can then use this information to manage the appropriate response to submitted requests.

In certain embodiments, the security analytics system 520 may be implemented in different operational configurations. In certain embodiments, the security analytics system 520 may be implemented alone or in conjunction with the endpoint agent of a protected endpoint 315. In certain embodiments, the security analytics system 520 may be implemented by using an endpoint agent at a protected endpoint 315 in combination with the edge device 202. In certain embodiments, cloud services may likewise be implemented for use by the protected endpoint 315, the edge device 202, and the security analytics system 520, individually or in combination. In certain embodiments, the security analytics system 520 may be oriented to performing risk assessment operations related to user actions, program actions, data accesses, or a combination thereof. In certain embodiments, program actions may be treated as a proxy for the user.

In certain embodiments, the endpoint agent 506 of a protected endpoint 315 may be implemented to update the security analytics system 520 with user behavior and associated contextual information, thereby allowing an offload of certain analytics processing overhead. In certain embodiments, this approach allows for longitudinal risk scoring, which assesses risk associated with certain user behavior during a particular interval of time. In certain embodiments, the security analytics system 520 may be implemented to access risk scores associated with the same user account, but accrued on different protected endpoints 315. It will be appreciated that such an approach may prove advantageous when an adversary is "moving sideways" through a network environment, using different protected endpoints 315 to collect information.

In certain embodiments, the security analytics system 520 may apply risk mitigations in a way that maximizes security effort return-on-investment (ROI). In certain embodiments, this approach may be accomplished by providing additional contextual and user behavior information associated with user requests. As an example, a web gateway may not concern itself with why a particular file is being requested by a certain entity at a particular point in time. Accordingly, if the file cannot be identified as malicious or harmless, there is no context available to determine how, or if, to proceed. To extend the example, the edge device 202 and security analytics system 520 may be coupled such that requests can be contextualized and fitted into a framework that evaluates their associated risk. In certain embodiments, such an approach works well with web-based data loss protection (DLP) approaches, as each transfer is no longer examined in isolation, but in the broader context of an identified user's actions, at a particular time, on the network 140.

As another example, the security analytics system 520 may be implemented to perform risk scoring processes to decide whether to block or allow unusual flows. In certain embodiments, this approach is applicable to defending against point-of-sale (POS) malware, a breach technique that has become increasingly more common in recent years. In certain embodiments, while various edge device 202 implementations may not stop all such exfiltrations, they may be able to complicate the task for the attacker.

In certain embodiments, the security analytics system 520 may be oriented to leverage contextual information associated with various user behaviors within the system. In certain embodiments, data flow tracking is performed by one or more endpoint agents in the protected endpoints 315, which allows the quantity and type of information associated with particular hosts to be measured. In turn, this information may be used to determine how the edge device 202 handles requests. By contextualizing such user behavior on the network 140, the security analytics system 520 can provide intelligent protection, making decisions that make sense in the broader context of an organization's activities. In certain embodiments, such an approach allows the information flowing through an organization, and the networks they employ, to be tracked, and substantial data breaches prevented. Skilled practitioners of the art will recognize that many such embodiments and examples are possible in view of the teachings of the present disclosure. Accordingly, the foregoing is not intended to limit the spirit, scope or intent of the invention.

Figure 6A:
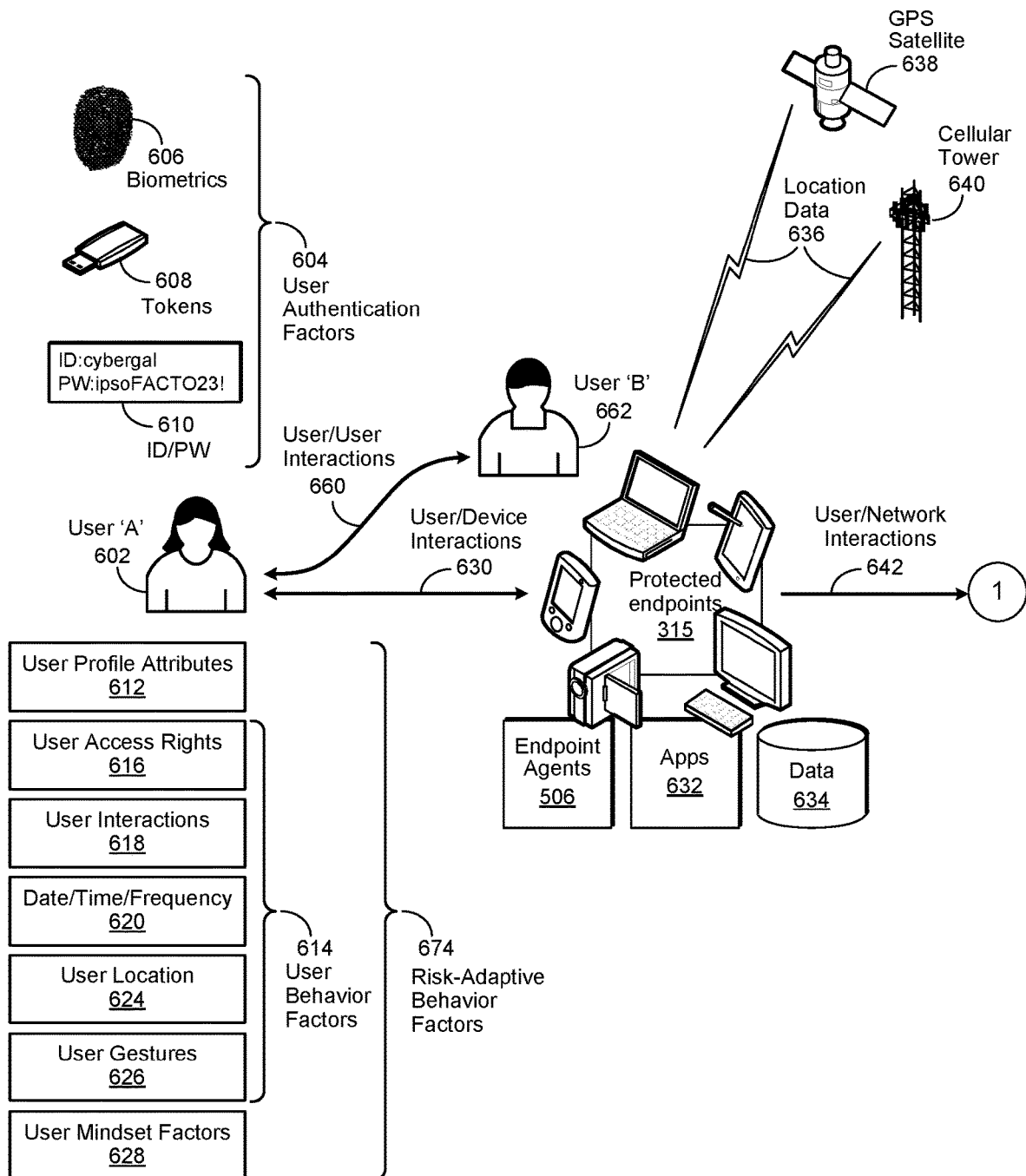
FIGS. 6a and 6b depict a simplified block diagram of another electronic environment in which certain embodiments of a protected endpoint may operate.
Figure 6B:
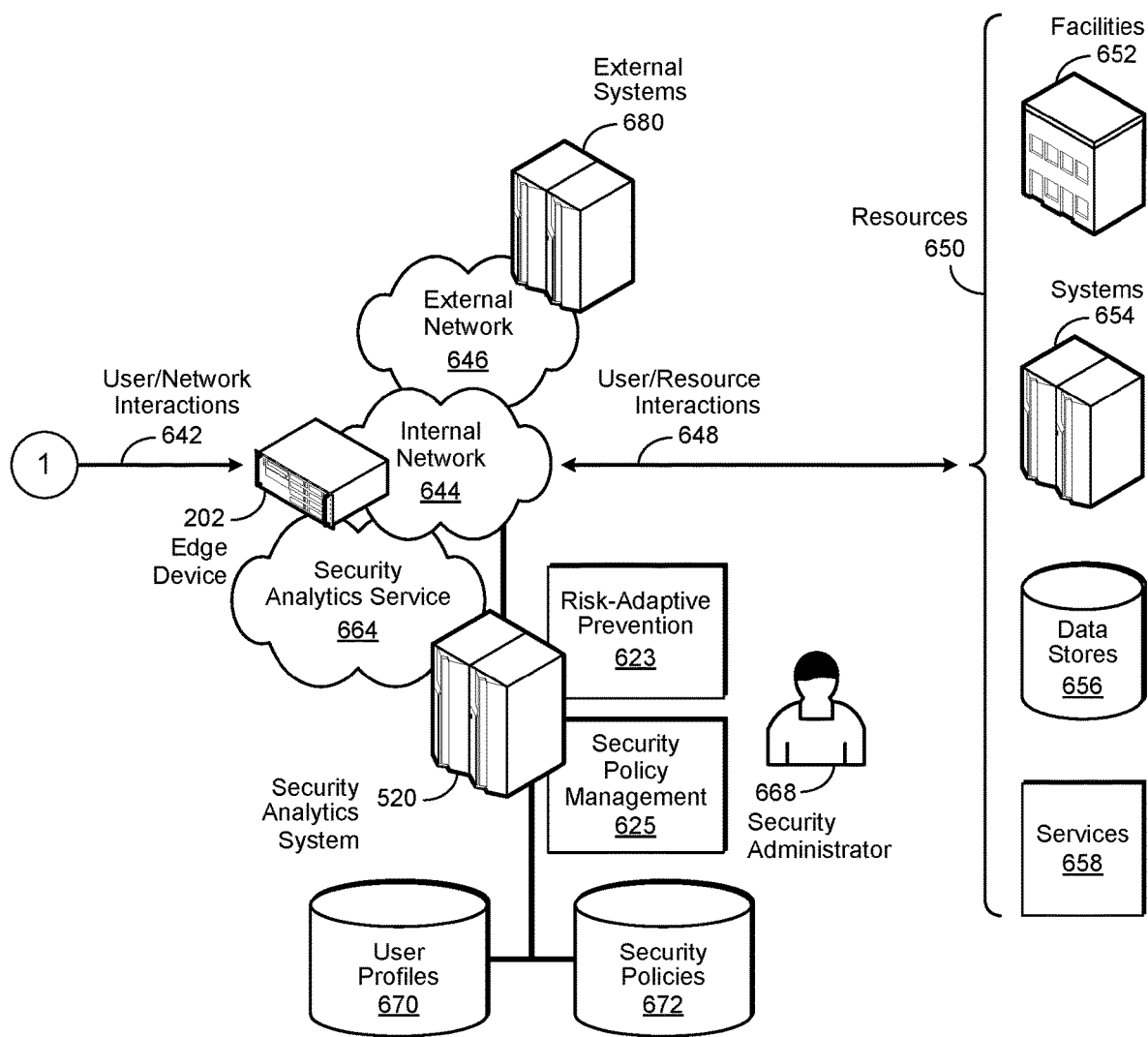

FIGS. 6*a* and 6*b* depict a simplified block diagram of another electronic environment in which certain embodiments of a protected endpoint may operate. In certain embodiments, analyses performed by the security analytics system 520 may be used to identify anomalous, abnormal, unexpected or malicious behavior associated with a user. In certain embodiments, the anomalous, abnormal, unexpected or malicious user behavior may be identified at a particular point in time, during the occurrence of an event, the enactment of a user behavior, or a combination thereof.

In certain embodiments, information associated with user behavior may be stored in a user profile. As used herein, a user profile broadly refers to a collection of information that uniquely describes a user's identity and their associated behavior, whether the behavior occurs within a physical realm or cyberspace. In certain embodiments, the user profile may be stored in a repository of user profiles 670. In certain embodiments, as described in greater detail herein, the user profile may include user profile attributes 612, user behavior factors 614, user mindset factors 628, or a combination thereof.

In certain embodiments, the security analytics system 520 may be implemented with a risk-adaptive protection module 623, a security policy management module 625, or a combination thereof. In certain embodiments, the risk-adaptive protection module 623 may be implemented to perform various risk-adaptive operations, described in greater detail herein. In certain embodiments, various risk-adaptive behavior factors 674, likewise described in greater detail herein, may be used to perform the risk-adaptive protection operations. In certain embodiments, the risk-adaptive behavior factors 674 may include user profile attributes 612, user behavior factors 614, user mindset factors 628, or a combination thereof. In these embodiments, the risk-adaptive behavior factors 674 used to perform the risk-adaptive protection operations is a matter of design choice.

As used herein, a user profile attribute 612 broadly refers to data or metadata that can be used, individually or in combination with other user profile attributes 612, to uniquely ascertain the identity of a user. In certain embodiments, the user profile attributes 612 may include certain personal information. In certain embodiments, the personal information may include non-sensitive personal information associated with a user, such as their name, title, position, role, and responsibilities. In certain embodiments, the personal information may likewise include technical skill level information, peer information, expense account information, paid time off (PTO) information, data analysis information, insider information, misconfiguration information, third party information, or a combination thereof.

In certain embodiments, the personal information may contain sensitive personal information associated with a user. As used herein, sensitive personal information (SPI), also commonly referred to as personally identifiable information (PII), broadly refers to any information usable to ascertain the identity of a user, either by itself, or in combination with other information, such as contextual information described in greater detail herein. Examples of SPI may include the full or legal name of a user, initials or nicknames, place and date of birth, home and business addresses, personal and business telephone numbers, their gender, and other genetic information.

Additional examples of SPI may include government-issued identifiers, such as a Social Security Number (SSN) or a passport number, vehicle registration plate and serial numbers, and driver's license numbers. Other examples of SPI may include certain email addresses and social media identifiers, credit and debit card numbers, and other digital identity information. Yet other examples of SPI may include employer-issued identifiers, financial transaction information, credit scores, electronic medical records (EMRs), insurance claim information, personal correspondence, and so forth. Further examples of SPI may include user authentication factors 604, such as biometrics 606, tokens 608, user identifiers and passwords 610, and personal identification numbers (PINs).

In certain embodiments, the user authentication factors 604 may be used to authenticate the identity of a user, such as user 'A' 602 or 'B' 662. In certain embodiments, the user authentication factors 608 may be used to ensure that a particular user, such as user 'A' 602 or 'B' 662, is associated with their corresponding user profile, rather than a user profile associated with another user. In certain embodiments, the user authentication factors 604 may include a user's biometrics 606, an associated security token 608, (e.g., a dongle containing cryptographic keys), or a user identifier/password (ID/PW) 610.

In certain embodiments, the user authentication factors 604 may be used in combination to perform multi-factor authentication of a user, such as user 'A' 602 or 'B' 662. As used herein, multi-factor authentication broadly refers to approaches requiring two or more authentication factors. In general, multi-factor authentication includes three classes of user authentication factors 604. The first is something the user knows, such as a user ID/PW 610. The second is something the user possesses, such as a security token 608. The third is something that is inherent to the user, such as a biometric 606.

In certain embodiments, multi-factor authentication may be extended to include a fourth class of factors, which includes one or more user behavior factors 614, or portions thereof. In these embodiments, the fourth class of factors may include user behavior the user has previously enacted, is currently enacting, or is expected to enact at some point in the future. In certain embodiments, the enactment of a user behavior may be associated with a particular event. In certain embodiments, multi-factor authentication may be performed on recurring basis. In various embodiments, the multi-factor authentication may be performed at certain time intervals during the enactment of a particular user behavior. In certain embodiments, the time interval may be uniform. In certain embodiments, the time interval may vary or be random.

In certain embodiments, the multi-factor authentication may be performed according to the occurrence of an event or the enactment of a particular user behavior, such as accessing a resource 650. In various embodiments, certain combinations of the multi-factor authentication described herein may be used according to the enactment of a particular user behavior. From the foregoing, those of skill in the art will recognize that the addition of such a fourth class of factors not only strengthens current multi-factor authentication approaches, but further, allows the factors to be more uniquely associated with a given user and their corresponding user profile.

Those of skill in the art will be aware that it is not uncommon for hackers, criminals and other actors to use various SPI to impersonate a user in order to gain unauthorized access to various systems, data, or facilities. It is likewise not uncommon for such individuals to masquerade as a user in order to collect their associated SPI for the purpose of identity theft. One known approach to gathering a user's SPI is to illicitly capture a data stream, such as a flow of network packets that include SPI sent by a user to another machine, such as an external system 880. Defenses against such approaches include encrypting the data stream prior to its communication across a network, such as the internal network 644 or external network 646 shown in FIG. 6.

However, other approaches, such as the use of a key logger, may surreptitiously capture the user's keystrokes or user gestures 626, described in greater detail herein, and communicate the resulting data stream in their native form to a hacker or other infiltrator. Another issue is the possibility that a normally-trusted insider, such as a security administrator 668, may have access to a decrypted data stream as part of their day-to-day responsibilities. As an example, a security administrator 668 may be using a security analytics system 520 to perform threat analysis related to a particular user. In the process, they may be exposed to various SPI associated with the user, such as certain user IDs and passwords 610. It will be appreciated that such exposure creates the opportunity for a security breach, whether intended or not. Another approach is to impersonate a legitimate website. In such approaches, the user may navigate to the site and innocently enter their ID/password 610, only to have them captured for later use in illegal activities.

As used herein, a user behavior factor 614 broadly refers to information associated with a user's behavior, whether the behavior occurs within a physical realm or cyberspace. In certain embodiments, user behavior factors 614 may include the user's access rights 616, the user's interactions 618, and the date/time/frequency 620 of when the interactions 618 are enacted. In certain embodiments, the user interactions 618 may include user/device 630, user/network 642, user/resource 648, user/user 660 interactions, or some combination thereof. In certain embodiments, the user/device 630 interactions may include an interaction between a user, such as user 'A' 602 or 'B' 662, and an protected endpoint 315. In certain embodiments, the user behavior factors 614 include the user's location 624, and the gestures 626 used to enact the interactions 618.

In certain embodiments, the user gestures 626 may include key strokes on a keypad, a cursor movement, a mouse movement or click, a finger swipe, tap, or other hand gesture, an eye movement, or some combination thereof. In certain embodiments, the user gestures 626 may likewise include the cadence of the user's keystrokes, the motion, force and duration of a hand or finger gesture, the rapidity and direction of various eye movements, or some combination thereof. In certain embodiments, the user gestures 626 may include various audio or verbal commands performed by the user.

In various embodiments, certain date/time/frequency 620 user behavior factors 614 may be implemented as ontological or societal time, or a combination thereof. As used herein, ontological time broadly refers to how one instant in time relates to another in a chronological sense. As an example, a first user behavior enacted at 12:00 noon on May 17, 2017 has occurred prior to a second user behavior enacted at 6:39 PM on May 18, 2018. Skilled practitioners of the art will recognize one value of ontological time is to determine the order in which various user behaviors have been enacted.

As likewise used herein, societal time broadly refers to the correlation of certain user profile attributes 612, user behavior factors 614, user mindset factors 628, or a combination thereof, to one or more instants in time. As an example, user 'A' 602 may access a system 654 to download a customer list at 3:47 PM on Nov. 3, 2017. Analysis of their user behavior profile indicates that it is not unusual for user 'A' 602 to download the customer list on a weekly basis. However, examination of their user behavior profile also indicates that user 'A' 602 forwarded the downloaded customer list in an email message to user 'B' 662 at 3:49 PM that same day. Furthermore, there is no record in their user behavior profile that user 'A' 602 has ever communicated with user 'B' 662 in the past. Moreover, it may be determined that user 'B' 662 is employed by a competitor. Accordingly, the correlation of user 'A' 602 downloading the customer list at one point in time, and then forwarding the customer list to user 'B' 662 at a second point in time shortly thereafter, is an example of societal time.

In a variation of the prior example, user 'A' 602 may download the customer list at 3:47 PM on Nov. 3, 2017. However, instead of immediately forwarding the customer list to user 'B' 662, user 'A' 602 leaves for a two week vacation. Upon their return, they forward the previously-downloaded customer list to user 'B' 662 at 9:14 AM on Nov. 20, 2017. From an ontological time perspective, it has been two weeks since user 'A' 802 accessed a system 654 to download the customer list. However, from a societal time perspective, they have still forwarded the customer list to user 'B' 662, despite two weeks having elapsed since the customer list was originally downloaded.

Accordingly, the correlation of user 'A' 602 downloading the customer list at one point in time, and then forwarding the customer list to user 'B' 662 at a much later point in time, is another example of societal time. More particularly, it may be inferred that the intent of user 'A' 602 did not changed during the two weeks they were on vacation. Furthermore, user 'A' 602 may have attempted to mask an intended malicious act by letting some period of time elapse between the time they originally downloaded the customer list and when they eventually forwarded it to user 'B' 662. From the foregoing, those of skill in the art will recognize that the use of societal time may be advantageous in determining whether a particular user behavior is acceptable, anomalous, abnormal, unexpected or malicious.

As used herein, mindset factors 628 broadly refer to information used to determine the mental state of a user at a particular point in time, during the occurrence of an event or an enactment of a user behavior, or combination thereof. As used herein, mental state broadly refers to a hypothetical state corresponding to the way a user may be thinking or feeling. In certain embodiments, the user mindset factors 628 may include a personality type. Examples of known approaches for determining a personality type include Jungian types, Myers-Briggs type indicators, Keirsy Temperament Sorter, Socionics, Enneagram of Personality, and Eyseneck's three-factor model.

In certain embodiments, the mindset factors 628 may include various behavioral biometrics. As likewise used herein, a behavioral biometric broadly refers to a physiological indication of a user's mental state. Examples of behavioral biometrics may include a user's blood pressure, heartrate, respiratory rate, eye movements and iris dilation, facial expressions, body language, tone and pitch of voice, speech patterns, and so forth.

Certain embodiments of the invention reflect an appreciation that certain user behavior factors 614, such as user gestures 626, may provide additional information related to determining a user's mental state. As an example, a user entering text at a quick pace with a rhythmic cadence may indicate intense focus. Likewise a user intermittently entering text with forceful keystrokes may indicate the user is in an agitated state. As another example, the user may intermittently enter text somewhat languorously, which may indicate being in a thoughtful or reflective state of mind. As yet another example, the user may enter text with a light touch with an uneven cadence, which may indicate the user is hesitant or unsure of what is being entered.

Certain embodiments of the invention likewise reflect an appreciation that while the user gestures 626 may indicate the mental state of a user, they may not provide the reason for the user to be in a particular mental state. Likewise, certain embodiments of the invention include an appreciation that certain user gestures 626 and behavioral biometrics are reflective of a user's personality type. As an example, aggressive, forceful keystrokes combined with an increased heart rate may indicate normal behavior for a particular user when composing end-of-month performance reviews. In various embodiments, certain user behavior factors 614, such as user gestures 626, may be correlated with certain contextual information.

As used herein, contextual information broadly refers to any information, directly or indirectly, individually or in combination, related to a particular user behavior. In certain embodiments, user behavior may include a user's physical behavior, cyber behavior, or a combination thereof. As likewise used herein, a user's physical behavior broadly refers to any user behavior occurring within a physical realm, such as speaking, gesturing, facial patterns or expressions, walking, and so forth. More particularly, such physical behavior may include any action enacted by a user that can be objectively observed, or indirectly inferred, within a physical realm. In certain embodiments, the objective observation, or indirect inference, of the physical behavior may be performed electronically.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user that can be observed through the use of an electronic device (e.g., an electronic sensor), a computing device or system (e.g., an endpoint device 304), computer instructions (e.g., a software application), or a combination thereof.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, which makes them electronically-observable.

As likewise used herein, cyberspace broadly refers to a network environment, such as an internal network 644 or external network 646, capable of supporting communication between two or more entities. In certain embodiments, the entity may be a user, a protected endpoint 315, or various resources, described in greater detail herein. In certain embodiments, the entities may include various protected endpoint 315 or resources 650 operating at the behest of an entity, such as a user. In certain embodiments, the communication between the entities may include audio, image, video, text, or binary data.

In certain embodiments, the contextual information may include a user's authentication factors 604. In certain embodiments, contextual information may likewise include various user identity resolution factors, such as personal information associated with the user, the date/time/frequency 620 of various user behavior, the user's location 624, the user's role or position in an organization, their associated access rights 616, and certain user gestures 626 employed by the user in the enactment of a user behavior. Other contextual information may likewise include various user interactions, whether the interactions are with a protected endpoint 315, a network 644, 646, a resource 850, or another user. In certain embodiments, user behaviors, and their related contextual information, may be collected at particular points of observation, and at particular points in time, described in greater detail herein.

In certain embodiments, a user profile may be processed with associated contextual information to generate correlated contextual information. In certain embodiments, the correlated contextual information, along with a user's user profile, may be used to perform certain user behavior analysis. In certain embodiments, the user behavior analysis may be performed by the security analytics system 520. In certain embodiments, the security analytics system 520 may be implemented to process a user profile and certain correlated contextual information associated with a user to determine their mental state at a particular point in time. In certain embodiments, the mental state of a user at a particular point in time may be used in combination with various user profile attributes 612 and user behavior factors 614, in the context of an associated user state, to infer a user's intent.

In certain embodiments, a user profile may be used with a first set of contextual information to determine the user's mental state at a first point in time and a second set of contextual information to determine their mental state at a second point in time. In certain embodiments, the user's mental state at a first point in time may correspond to the occurrence of a first user event and the user's mental state at a second point in time may correspond to the occurrence of a second user event. Certain embodiments of the invention reflect an appreciation that such a first and second set of contextual information may be decidedly different, which may provide context for the user's mental state at different times and during the occurrence of different user events. Likewise, the first and second set of contextual information may be substantively the same, which may provide an indication that while the user's mental state may be different at two points in time, or during the occurrence of two different user events, the cause of their mental state may not be related to the contextual information that was collected at the two points in time.

It will be appreciated that over time, the user behavior of a particular user, such as user 'A' 602, will be uniquely different and distinct from another user, such as user 'B' 662. Accordingly, user profile '1' will uniquely reflect the user behavior of user '1', just as user profile 'n' will uniquely reflect the user behavior of user 'n'. As an example, user 'A' 602 may have a user profile attribute 612 of sales administrator. Upon arriving at their office in the morning, the user consistently checks their email, item by item, responding to each in turn, followed by processing expense reports for field sales personnel. Then, after lunch, the user may access and review sales forecasts on an internal system 654. Furthermore, the user may exhibit sporadic keyboard entry interspersed with extensive mouse activity, or user gestures 626, when perusing the sales forecasts.

Moreover, personality type information associated with user 'A' 602 may indicate the user consistently exhibits a positive, outgoing attitude. In this example, the sequence of the activities enacted by user 'A' 602 throughout the day, and their frequency, correspond to their expected date/time/ frequency 620 user behavior factors 614. Likewise, the keyboard cadence and other user gestures 626 are examples of granular user behavior factors 614, while the personality type information is an example of an abstract user behavior factor 614.

As another example, user 'B' 662 may have a user profile attribute 612 of financial controller. Upon arriving at their office in the morning, the user usually scans their email messages, responding only to those that are urgent. Then they check the daily budget status of each department to see whether they are conforming to their respective guidelines. After lunch, the user may follow up on emails that are less urgent, followed by updating the organization's financials, likewise on an internal system 654. Additionally, user 'B' 662 may exhibit deliberate keyboard entry interspersed with iterative mouse activity, or user gestures 626, when updating financial information. Moreover, personality type information associated with user 'B' 662 may indicate they consistently exhibit a reserved, introspective and contemplative attitude. As in the prior example, the sequence of the activities enacted by user 'B' 662 throughout the day, and their frequency, correspond to their expected date/time/ frequency 620 user behavior factors 614. Likewise, as before, the keyboard cadence and other user gestures 626 are examples of granular user behavior factors 614, while the personality type information is an example of an abstract user behavior factor 614.

It will likewise be appreciated that the user behavior of a particular user may evolve over time. As an example, certain user behavior exhibited by a user during the first month of assuming a new position within an organization may be quite different than the user behavior exhibited after being in the position for six months. To continue the example, the user may be somewhat tentative when learning to access and interact with unfamiliar resources 650 in the first month in the position, but by the sixth month, such access and interaction is commonplace and routine.

In certain embodiments, a user behavior factor 614 associated with a particular user, such as user 'A' 602 or 'B' 662, may be used by the security analytics system 520 to compare the user's current user behavior to past user behavior. If the user's current user behavior matches their past user behavior, then the security analytics system 520 may determine that the user's user behavior is acceptable. If not, then the security analytics system 520 may determine that the user's user behavior is anomalous, abnormal, unexpected or malicious.

However, as described in greater detail herein, a change in a particular user's user behavior over time may not be anomalous, abnormal, unexpected, or malicious. Instead, it may be acceptable behavior that simply evolves over time as a natural result of day-to-day user/device 630, user/network 642, user/resource 648, or user/user 660 interactions. In certain embodiments, the security analytics system 520 may be implemented to determine whether such changes in a user's user behavior over time are acceptable, anomalous, abnormal, unexpected or malicious. In certain embodiments, a user behavior profile may be implemented in combination with the security analytics system 520 to make this temporal determination.

It will be appreciated that anomalous, abnormal, unexpected or malicious user behavior may include inadvertent or compromised user behavior. For example, the user may have innocently miss-entered a request for data that is proprietary to an organization. As another example, the user may be attempting to access confidential information as a result of being compromised. As yet another example, a user may attempt to access certain proprietary data from their home, over a weekend, and late at night. In this example, the user may be working from home on a project with an impending deadline. Accordingly, the attempt to access the proprietary data is legitimate, yet still anomalous, abnormal or unexpected as the attempt did not occur during the week, from the user's place of employment, during normal work hours. However, the user behavior may manifest in context with consistent remote access patterns and provide sufficient evidence to determine the nature of the activity.

Likewise, the security analytics system 520 may determine that the user's user behavior to be malicious. As yet another example, an impostor may be attempting to pose as a legitimate user in an attempt to exploit one or more resources 650. In this example, the attempt to exploit one or more resources 650 is malicious user behavior. As yet still another example, a legitimate user may be attempting to increase their level of access to one or more resources 650. In this example, the user's attempt to increase their level of access may indicate malicious user behavior.

To further extend these examples, such resources 650 may include various facilities 652, systems 654, data stores 656, or services 658. In certain embodiments, the security analytics system 520 may be implemented to block a user if it is determined their user behavior is anomalous, abnormal, unexpected or malicious. In certain embodiments, the security analytics system 520 may be implemented to modify a request submitted by a user if it is determined the request is anomalous, abnormal, unexpected or malicious. In certain embodiments, the security analytics system 520 may be implemented to modify an outcome. For example, the security analytics system 520 may encrypt a file when a copy operation or request is detected.

In certain embodiments, the user profile may be implemented as a cyberprofile. A cyberprofile, as used herein, broadly refers to a collection of information that uniquely describes an entity and their associated behavior within cyberspace. In certain embodiments, the security analytics system 520 may be implemented to use information associated with certain user behavior elements to define and manage a user profile. A user behavior element, as used herein, broadly refers to a discrete element of a user's behavior during the performance of a particular operation, or the occurrence of a particular event, in a physical realm, cyberspace, or a combination thereof. In certain embodiments, such user behavior elements may be associated with a user/device 630, a user/network 642, a user/resource 648, a user/user 660 interaction, or combination thereof.

As an example, user 'A' 602 may use a protected endpoint 315 to browse a particular web page on a news site on the Internet. In this example, the individual actions performed by user 'A' 602 to access the web page are user behavior elements that constitute a user behavior. As another example, user 'A' 602 may a protected endpoint 315 to download a data file from a particular system 654. In this example, the individual actions performed by user 'A' 602 to download the data file, including the use of one or more user authentication factors 604 for user authentication, are user behavior elements that constitute a user behavior. In certain embodiments, the user/device 630 interactions may include an interaction between a user, such as user 'A' 602 or 'B' 662, and a protected endpoint 315.

In certain embodiments, the user/device 630 interaction may include interaction with a protected endpoint 315 that is not connected to a network at the time the interaction occurs. As an example, user 'A' 602 or 'B' 662 may interact with a protected endpoint 315 that is offline, using applications 632, accessing data nor 634, or a combination thereof, it may contain. Those user/device 630 interactions, or their result, may be stored on the protected endpoint 315 and then be accessed or retrieved at a later time once the protected endpoint 315 is connected to the internal network 644 or external network 646.

In certain embodiments, the protected endpoint 315 may be used to communicate data through the use of an internal network 644, an external network 646, or a combination thereof. In certain embodiments, the internal network 644 and the external network 646 may include a public network, such as the Internet, a physical private network, a virtual private network (VPN), or any combination thereof. In certain embodiments, the internal network 644 and external network 646 may likewise include a wireless network, including a personal area network (PAN), based on technologies such as Bluetooth. In various embodiments, the wireless network may include a wireless local area network (WLAN), based on variations of the IEEE 802.11 specification, commonly referred to as Wi-Fi. In certain embodiments, the wireless network may include a wireless wide area network (WWAN) based on an industry standard including various 3G, 4G and 5G technologies.

In certain embodiments, the user/resource 648 interactions may include interactions with various resources 650. In certain embodiments, the resources 650 may include various facilities 652 and systems 654, either of which may be physical or virtual, as well as data stores 656 and services 658. In certain embodiments, the user/user 660 interactions may include interactions between two or more users, such as user 'A' 602 and 'B' 662. In certain embodiments, the user/user interactions 860 may be physical, such as a face-to-face meeting, via a user/device 630 interaction, a user/network 642 interaction, a user/resource 648 interaction, or some combination thereof.

In certain embodiments, the user/user 660 interaction may include a face-to-face verbal exchange between two users. In certain embodiments, the user/user 660 interaction may include a written exchange, such as text written on a sheet of paper, between two users. In certain embodiments, the user/user 660 interaction may include a face-to-face exchange of gestures, such as a sign language exchange, between two users. In certain embodiments, temporal event information associated with various interactions 630, 642, 648, 660 may be collected and used to define and manage a user profile.

In certain embodiments, the security analytics system 520 may be implemented to observe user behavior at one or more points of observation within a physical domain or cyberspace environment. In certain embodiments, the points of observation may occur during various user interactions, such as user/device 630, user/network 642, user/resource 648, and user/user 660 interactions. As an example, a user/user 660 interaction may include an interaction between user 'A' 602 and 'B' 662.

In certain embodiments, the point of observation may include cyber behavior of various kinds within an internal network 644. As an example, the cyber behavior within an internal 644 network may include a user accessing a particular internal system 654 or data store 656. In certain embodiments, the point of observation may include cyber behavior of various kinds within an external network 646. As an example, the cyber behavior within an external network 646 may include a user's social media activities or participation in certain user forums. Those of skill in the art will recognize that many such examples of user/device 630, user/network 642, user/resource 648, and user/user 660 interactions are possible. Accordingly, the foregoing is not intended to limit the spirit, scope or intent of the invention.

In certain embodiments, the security analytics system 520 may be implemented to process certain contextual information to ascertain the identity of an entity at a particular point in time. In certain embodiments, the contextual information may include location data 636. In certain embodiments, the protected endpoint 315 may be configured to receive such location data 636, which is used as a data source for determining the user's location 624.

In certain embodiments, the location data 636 may include Global Positioning System (GPS) data provided by a GPS satellite 638. In certain embodiments, the location data 636 may include location data 636 provided by a wireless network, such as from a cellular network tower 640. In certain embodiments (not shown), the location data 636 may include various Internet Protocol (IP) or other network address information assigned to the protected endpoint 315 or edge device 202. In certain embodiments (also not shown), the location data 636 may include recognizable structures or physical addresses within a digital image or video recording.

In certain embodiments, the protected endpoints 315 may include an input device (not shown), such as a keypad, magnetic card reader, token interface, biometric sensor, digital camera, video surveillance camera, and so forth. In certain embodiments, such protected endpoints 315 may be directly, or indirectly, connected to a particular facility 652 or system 654. As an example, a protected endpoint 315 may be directly connected to an ingress/egress system, such as an electronic lock on a door or an access gate of a parking garage. As another example, a protected endpoint 315 may be indirectly connected to a physical security mechanism through a dedicated security network.

In certain embodiments, the security analytics system 520 may be implemented as a stand-alone system. In certain embodiments, the security analytics system 520 be implemented as a distributed system. In certain embodiment, the security analytics system 520 may be implemented as a virtual system, such as an instantiation of one or more virtual machines (VMs). In certain embodiments, the security analytics system 520 may be implemented to use various event data stored in a repository of persistent event data 670 to perform certain probability distribution analyses, described in greater detail herein.

In certain embodiments, the security analytics system 520 may be include risk-adaptive protection service 664. In certain embodiments, the risk-adaptive protection service 664 may be implemented in a cloud environment familiar to those of skill in the art. Those of skill in the art will recognize that many such embodiments are possible. Accordingly, the foregoing is not intended to limit the spirit, scope or intent of the invention.

Figure 7:
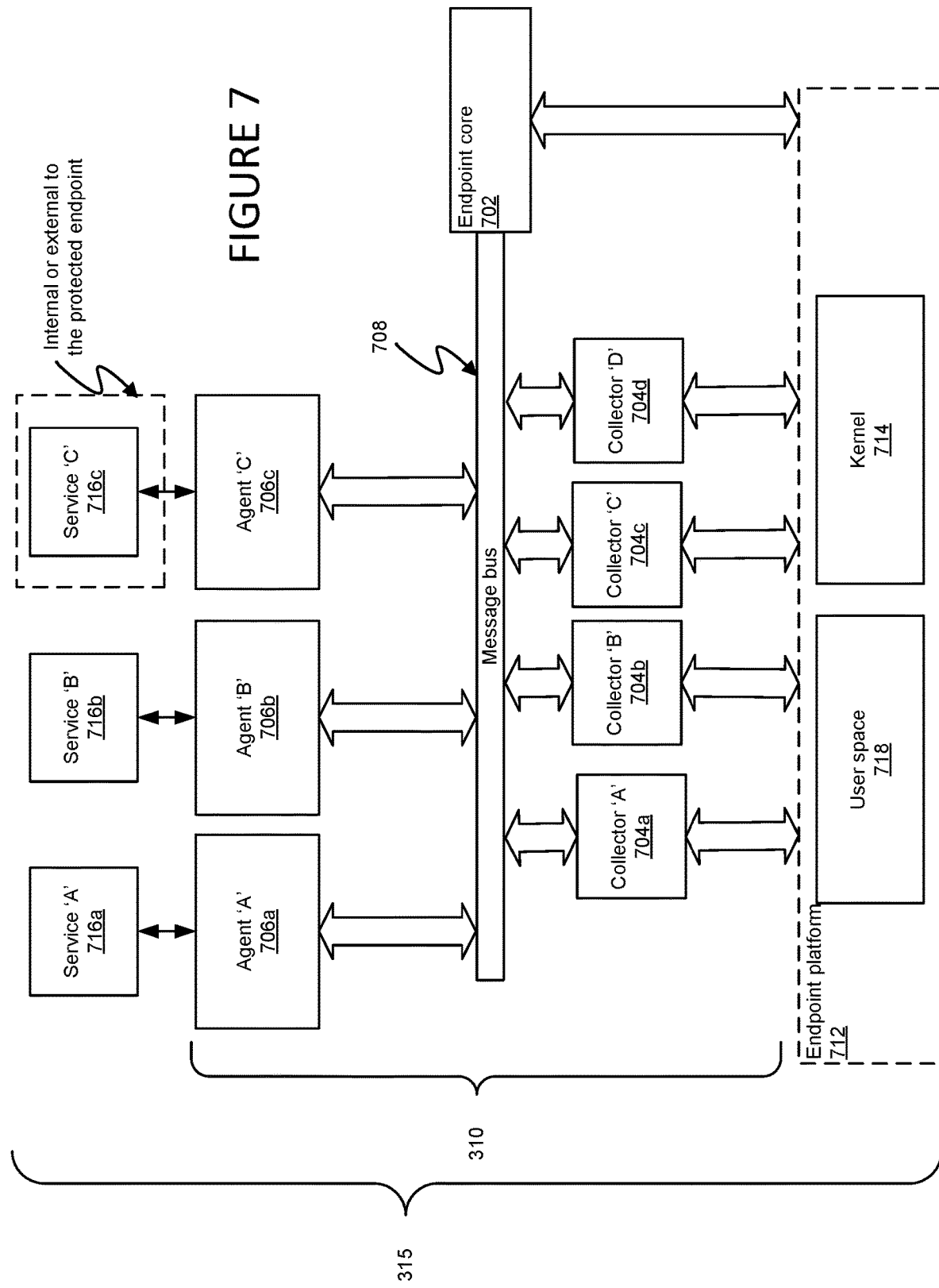
FIG. 7 is a block diagram showing one example of an implementation of a unified endpoint system.

FIG. 7 is a block diagram showing one example of an implementation of a unified endpoint system 310. In certain embodiments, the unified endpoint system 310 includes an endpoint core 702 that is operable to configure one or more endpoint collectors 704 and one or more endpoint agents 706 over a common message bus 708. In certain embodiments, such configuration operations may include initial loading of collectors 704 and agents 706 for use on the protected endpoint 315. In certain embodiments, such configuration operations are static and only occur during initialization of the unified endpoint system 310. In certain embodiments, the endpoint core 702 may dynamically load, unload, and/or reconfigure the collectors 704 and agents 706 during operation of the protected endpoint 315. In certain embodiments, the endpoint core 702 operates as a conduit for communications between the endpoint collectors 704 and endpoint agents 706. In certain embodiments, the endpoint collectors 704 and endpoint agents 706 communicate with the endpoint core 702 through one or more Application Programming Interfaces (APIs) to facilitate communications between the endpoint collectors 704 and endpoint agents. In certain embodiments, a single collector API is used to facilitate communications between the endpoint collectors 704 and the endpoint core 702. In certain embodiments, a single agent API is used to facilitate communications between the endpoint agents 706 and the endpoint core 702.

In certain embodiments, the endpoint collectors 704 are configured to detect activities occurring on an endpoint platform 712. As used herein, an endpoint platform includes, without limitation, the kernel 714 and/or user space 718 operating at an endpoint device 305. In certain embodiments, one or more of the endpoint collectors 704 may be configured to detect activities occurring in the kernel 714 of the endpoint platform 712. In certain embodiments, activities occurring in the kernel 714 may include filesystem activity, process activity, information relating to endpoint device performance metrics, etc. In certain embodiments, one or more of the endpoint collectors 704 may be configured to detect activities occurring in the user space 718 of the endpoint platform 712. In certain embodiments, activities occurring in user space 718 may include network activity, web browser activity, web browser extension activity, etc. In certain embodiments, all endpoint collectors 704 of the unified endpoint system 310 are configured to detect activities in the kernel 714, while activities within user space 718 are ignored. In certain embodiments, all endpoint collectors 704 of the unified endpoint system 310 are configured to detect activities in the user space 718, while activities within kernel 714 are ignored. In certain embodiments, one or more of the endpoint collectors 704 are configured to detect activities in the kernel 714, while other endpoint collectors 704 are configured to detect activities in the user space 718. In certain embodiments, a single collector 704 may be configured to filter activities and/or of events occurring on the endpoint platform 712 so that only certain activities and/or events at the input of the collector 704 are used to generate the corresponding events which the collector 704 places on the message bus 708. It will be recognized, in view of the present disclosure, that various endpoint collector combinations and corresponding filter configurations may be employed to provide the desired event information on the message bus 708.

In certain embodiments, the activities received by one or more of the endpoint collectors 704 include raw activity information that the endpoint collector converts to events corresponding to the detected raw activities. In certain embodiments, raw activities may be provided from the kernel 714. In certain embodiments, the activities received by one or more of the endpoint collectors 704 are in the form of events corresponding to activities occurring on the endpoint platform 712. In certain embodiments, such events may be provided from the user space 718 and/or kernel 714. In certain embodiments, events corresponding to the detected activities and/or events received by one or more of the endpoint collectors 704 are placed on the common message bus 708 by the endpoint collectors 704.

The example shown in FIG. 7 also includes a plurality of endpoint agents 706 configured to receive events from the endpoint collectors 704 over the message bus 708. In certain embodiments, each endpoint agent 706 is configured to selectively process only those events on the message bus 708 to which the endpoint agent 706 has subscribed. As used herein, selective processing refers to actual processing of the received event data to provide information for further processing by a security service, and/or pass-through of one or more of the subscribed events to a security service. In certain embodiments, an endpoint agent 706 may add any communication overhead to a pass-through event needed to transfer the events from the endpoint agent 706 to a security service 716.

In certain embodiments, a given endpoint agent 706 may subscribe to events from multiple collectors 704, a subset of events from multiple collectors 704, or a subset of events from a single collector 704. For example, Agent 'A' 706a may subscribe to all events provided on the message bus 708 from both Collector 'A' 704a and Collector 'B' 704b. In another example, Agent 'A' 706a may subscribe to only a subset of events provided on the message bus 708 from Collector 'A' 704a and Collector 'B' 704b. In another example, Agent 'A' 706a may subscribe to only a subset of events provided on the message bus 708 from Collector 'B' 704b. These examples may be extended to subscriptions by each endpoint agent 706 for events generated by each collector 704 thereby illustrating the versatile manner in which selective processing of events by the endpoint agents 706 may be implemented. Since only those events to which an endpoint agent 706 has subscribed are selectively processed by the endpoint agent 706, processing of events that are not relevant to the endpoint agent 706 are avoided thereby reducing the amount of processing resources needed by an endpoint agent to execute the processes for which it is designed.

In the example shown in FIG. 7, each of the endpoint agents 706 is configured with a service connection to provide information to one or more corresponding security services 716. The information provided by an endpoint agent to a security service 716 is based on events that are selectively processed by the endpoint agent 706. As used herein, a security service generally refers to the utility of a functional module and is not limited to functions that run as services within the context of an operating system. In certain embodiments, each endpoint agent 706 is associated with a respective security service 716. In the illustrated example, Agent 'A' 706a has a service connection with Service 'A' 716a, Agent 'B' 706b has a service connection with Service 'B' 716b, and Agent 'C' 706c is a service connection with Service 'C' 716c.

In certain embodiments, some of the security services 716 are implemented within the protected endpoint 315. Such services are shown in FIG. 7 as Service 'A' 716a and Service 'B' 716b. In certain embodiments, one or more security services 716 may be implemented on the protected endpoint or on a platform exterior to the protected endpoint 315. One such service is shown in FIG. 7 as Service 'C' 716c. In certain embodiments, primary security services required during operation of the protected endpoint 315 may be implemented at the protected endpoint 315, while secondary security services not required during operation of the protected endpoint 315 may be offloaded to an exterior platform. In certain embodiments, some security services may be included as a set of standard security services that are consistently provided on a protected endpoint 315, while optional security services may be provided as add-ons. The architecture and operation of the unified endpoint system 310 provides the versatility and flexibility to provide such options.

In certain embodiments, the events to which an endpoint agent 706 subscribes may be limited to those events that are needed by the endpoint agent 706 to provide the information required by the connected security service 716. In certain embodiments, the information provided from a given endpoint agent 706 to a given security service 716 is generated by directly executing processing operations on the subscribed event data itself. Additionally, or on the alternative, the endpoint agent 706 may operate as a conduit for passing subscribed events to the connected security service 716 without directly processing the actual data of the subscribed events. In certain embodiments, subscribed events that are passed directly through the endpoint agent 706 to the corresponding security service 716 may include additional communication overhead unrelated to direct processing of the data of the subscribed event.

Certain embodiments of the unified endpoint system 310 provide a versatile and flexible platform for executing security services based on events occurring in different portions of the endpoint platform 712. In certain embodiments, different endpoint agents 706 may subscribe to one or more of the same events thereby allowing the same events to be viewed from different security perspectives by the endpoint agents 706 and security services 716. In certain embodiments, the configuration of the unified endpoint system 310 may be programmed remotely through the endpoint core 702 to implement various combinations and configurations for the endpoint collectors 704 and endpoint agents 706.

In certain embodiments, the activities and/or events collected by a collectors 704 may be dynamically controlled based on the efficiency of the collector's processing operations. For example, an endpoint collector may be dynamically configured to only process a reduced subset of the total activities/events that it is designed to collect. In certain embodiments, an endpoint collector may be dynamically configured to reduce the frequency with which it collects one or more activities/events. In certain embodiments, the unified endpoint system 310 may operate to implement multiple dynamic configurations depending on the degree of processing efficiency of the endpoint collector.

In certain embodiments, the events to which an endpoint agent 706 may be dynamically controlled based on the efficiency of the endpoint agent's and/or security service's processing operations. For example, an endpoint agent may be dynamically configured to reduce the number and/or type of events to which it subscribes, where the endpoint agent subscribes to a higher number and/or more complex set of events during optimal efficiency, and subscribes to a reduced subset of event types and/or number of events when efficiency is less than optimal. In certain embodiments, an endpoint agent may be dynamically configured to reduce the frequency at which it processes one or more subscribed events. In certain embodiments, the unified endpoint system 310 may operate to implement multiple dynamic configurations of an endpoint agent 706 depending on the degree of processing efficiency of the endpoint agent.

Figure 8:
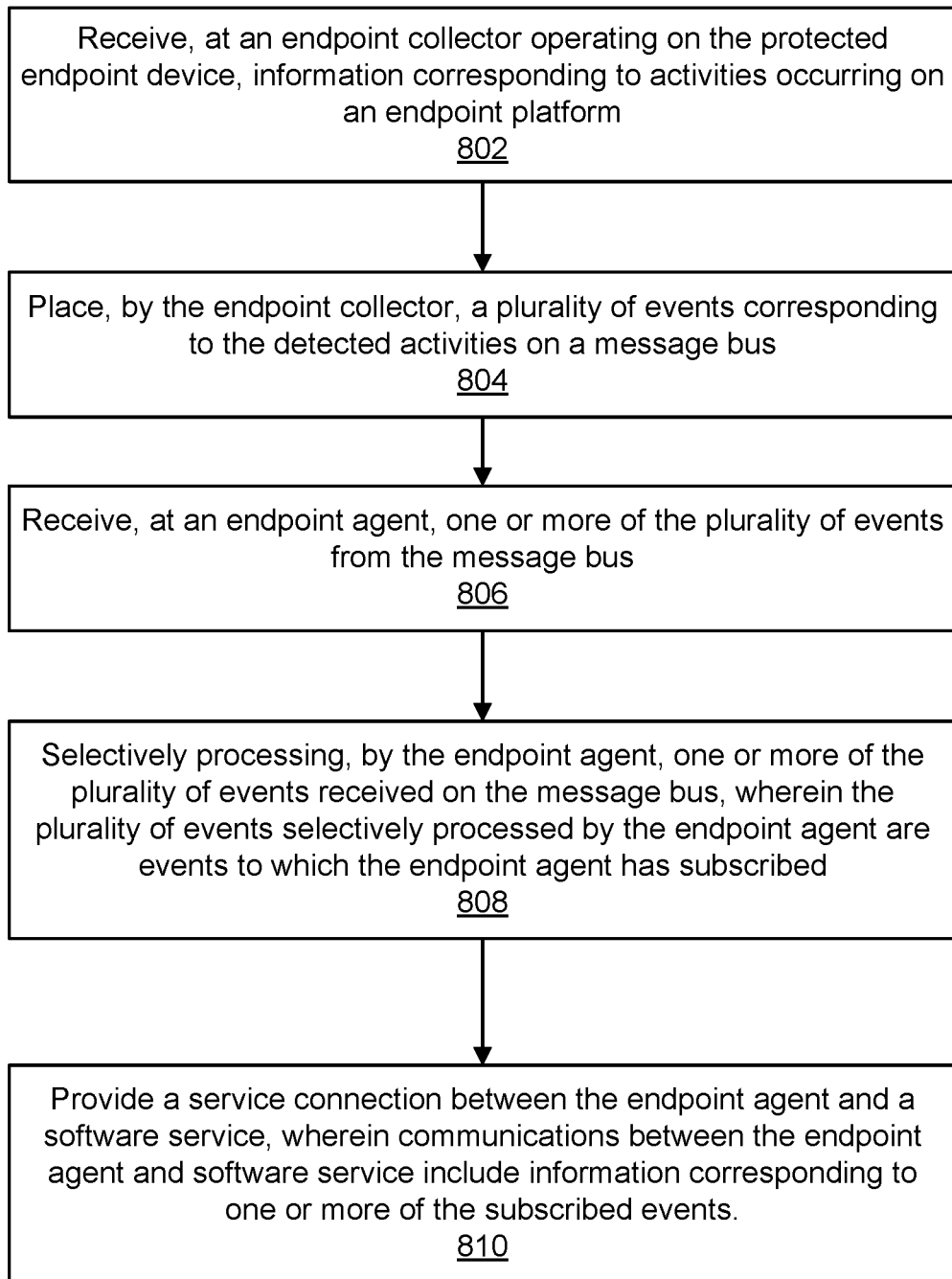
FIG. 8 is a flowchart depicting operations that may be executed in certain embodiments of the unified endpoint system.

FIG. 8 is a flowchart depicting operations that may be executed in certain embodiments of the unified endpoint system 310. In certain embodiments, an endpoint collector operating on the protected endpoint device receives information corresponding to activities occurring on an endpoint platform at operation 802. In certain embodiments, the endpoint collector places a plurality of events corresponding to the detected activities on a message bus at operation 804. In certain embodiments, at operation 808, the endpoint agent selectively processes one or more of the plurality of events received on the message bus. In certain embodiments, the plurality of events selectively processed by the endpoint agent are events to which the endpoint agent has subscribed. In certain embodiments, a service connection is provided between the endpoint agent and a software service at operation 810. In certain embodiments, the communications between the endpoint agent and software service include information corresponding to one or more of the subscribed events.

Figure 9:
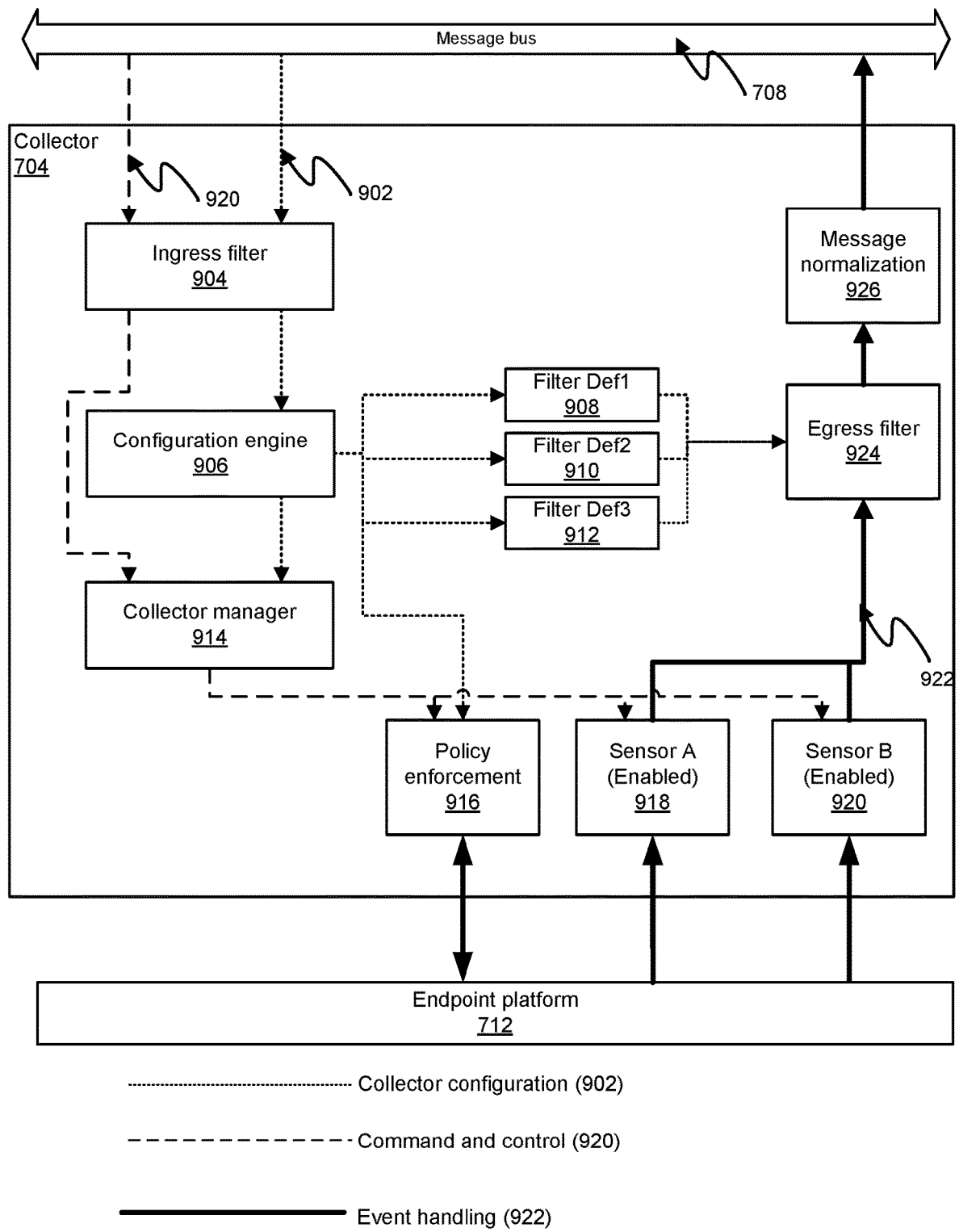
FIG. 9 is a simplified block diagram of one manner of implementing certain embodiments of an endpoint collector of the unified endpoint system.

FIG. 9 is a simplified block diagram of one manner of implementing certain embodiments of an endpoint collector 704 of the unified endpoint system 310. In certain embodiments, the endpoint collector 704 includes multiple communication paths over which various types of information are transferred both internally and externally. Certain information external to the collector 704 may be received from the common message bus 708, while other information, such as activity information and/or events may be received from the endpoint platform 712.

In certain embodiments, the endpoint collector 704 implements a collector configuration path 902 to carry information which initially configures and, in certain embodiments, dynamically configures the operation of the endpoint collector 704. In certain embodiments, collector configuration information may be communicated from the endpoint core 702 over the message bus 708. In certain embodiments, the endpoint core 702 provides collector configuration communications to multiple collectors 704. Accordingly, certain embodiments of the endpoint collector 704 may include an ingress filter 904 to ensure that the endpoint collector 704 only responds to collector configuration communications intended for the particular endpoint collector while ignoring configuration communications intended for other endpoint collectors.

In certain embodiments, collector configuration information is passed from the ingress filter 904 to an input of a collector configuration engine 906. In certain embodiments, the collector configuration engine 906 uses the information in the configuration communications to define one or more filter definitions shown in FIG. 9 as Filter Def1 908, Filter Def2 910, Filter Def3 912, described in further detail herein. In certain embodiments, the collector configuration engine 906 uses the information in the configuration communications to configure a collector manager 914. In turn, the collector manager 914 may communicate with a policy enforcement module 916. In certain embodiments, the policy enforcement module 916 responds to certain events occurring at the endpoint platform 712 to provide immediate enforcement of certain security policies at the endpoint collector 704. For example, the policy enforcement module 916 may be configured to prevent transmission of predetermined files from the protected endpoint 315 to another entity over a network. If the policy enforcement module 916 receives information from the endpoint platform 712 that an attempt to transmit one or more of the predetermined files is underway, the policy enforcement module 916 may direct the endpoint platform 712 to prevent the transmission. In another example, a user at a protected endpoint 315 may attempt to launch an unauthorized web browser at the protected endpoint 315. If the policy enforcement module 916 detects an attempt to launch the unauthorized web browser, the policy enforcement module 916 may direct the endpoint platform 712 to prevent the launch. As will be recognized in view of the teachings of the present disclosure, the policy enforcement module 916 may be used to enforce various security policies, some of which may be initialized by the collector configuration engine 906 based on configuration communications received from the endpoint core 702.

In certain embodiments, the endpoint collector 704 implements a command and control path, shown generally at 920. In certain embodiments, command and control communications may include information provided by the endpoint core 702 to the endpoint collector 704. In certain embodiments, the endpoint core 702 provides command and control communications to multiple endpoint collectors 704. Accordingly, certain embodiments use the ingress filter 904 to ensure that the endpoint collector 704 only responds to command and control communications intended for the particular endpoint collector while ignoring command and control communications intended for other endpoint collectors. In certain embodiments, command and control communications may be passed from the ingress filter 904 to a collector manager 914. In certain embodiments, the collector manager 914 operates to enable and disable the sensors of the collector 704. In the example shown in FIG. 9, the collector 704 includes two sensors—Sensor A 918 and Sensor B 920. In certain embodiments, the collector manager 914 may initialize sensors 918 and 920 using information provided by the collector configuration engine 906 that is based on configuration information received, for example, from the endpoint core 702 on the message bus 708. In certain embodiments, the collector manager may dynamically configure sensors 918 and 920 based on command and control information on the message bus 708. In certain embodiments, such dynamic configuration may include enabling and/or disabling one or more of the sensors 918 and 920.

In certain embodiments, the endpoint collector 704 implements an event handling path, shown generally at 922. In certain embodiments, one or more of the sensors 918, 920 monitor activity at the endpoint platform 712 and provide event information to the input of an egress filter 924. In certain embodiments, the activity provided from the endpoint platform 712 to one or more of the sensors 918, 920 are provided as raw activities. In certain embodiments, such raw activities are converted to an event format. In certain embodiments, the activity provided from the endpoint platform to one or more of the sensors 918, 920 is provided in the form of events. In certain embodiments, the events provided from the sensors 918, 920 are provided to the input of an egress filter 924. In certain embodiments, the filter definitions 908, 910, and 912 configure the egress filter 924 so that only certain events are passed therethrough to the input of a message normalization module 926. In certain embodiments, the filtered events received by the message normalization module 926 are placed in a standardized format for communication on the message bus 708. In certain embodiments, the filter definitions 908, 910, and 912 are defined during an initial configuration of the endpoint collector 704 and remain static throughout operation of the endpoint collector 704. In certain embodiments, filter definitions along 908, 910 and 912 may be dynamically updated during operation of the endpoint collector 704 based on command and control information received by the collector configuration engine 906.

Based on the teachings of the present disclosure, those skilled in the art will recognize that various other embodiments of the endpoint collector 704 may be implemented. Accordingly, the embodiment of the endpoint collector 704 shown and described in connection with FIG. 9 is for illustrative purposes and is not intended to describe all potential endpoint collector architectures that may be used in the unified endpoint system 310.

Figure 10:
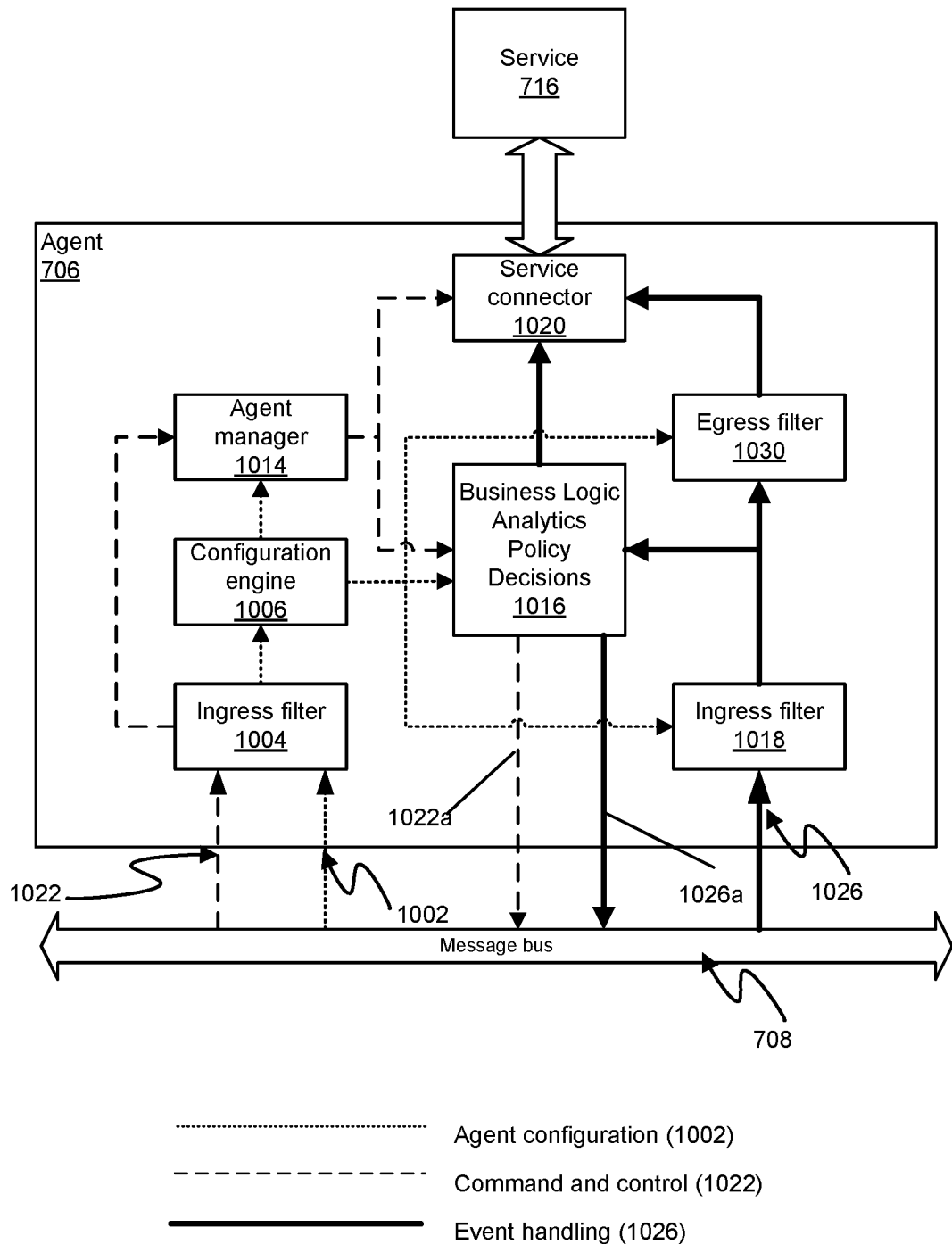
FIG. 10 is a simplified block diagram of one manner of implementing certain embodiments of an endpoint agent of the unified endpoint system.

FIG. 10 is a simplified block diagram of one manner of implementing certain embodiments of an endpoint agent 706 of the unified endpoint system 310. In certain embodiments, the endpoint agent 706 includes multiple communication paths over which various types of information are transferred both internally and externally.

In certain embodiments, the endpoint agent 706 implements an agent configuration path 1002 to carry information which initially configures and, in certain embodiments, dynamically reconfigures the operation of the endpoint agent 706. In certain embodiments, agent configuration information may be communicated from the endpoint core 702 over the message bus 708. In certain embodiments, the endpoint core 702 provides agent configuration communications to multiple agents 706. Accordingly, certain embodiments of the endpoint agent 706 may include an ingress filter 1004 to ensure that the endpoint agent 706 only responds to agent configuration communications intended for the particular endpoint agent while ignoring configuration communications intended for other endpoint agents.

In certain embodiments, agent configuration information is passed from the ingress filter 1004 to an input of a collector configuration engine 1006. In certain embodiments, the configuration engine 1006 uses the information in the configuration communications to define an initial set of events to which the endpoint agent 706 is to be subscribed. In certain embodiments, the configuration engine 1006 configures an event ingress filter 1018 with subscribed events that are to be passed through the ingress filter 1018 for selective processing by the endpoint agent 706. In certain embodiments, the configuration engine 1006 uses the information in the configuration communications to configure an agent manager 1014. In certain embodiments, the configuration engine 1006 may communicate with a business logic analytics/policy decisions module 1016 to implement an initial configuration of the module 1016. In certain embodiments, the business logic analytics/policy decisions module 1016 executes analytics operations on subscribed events for provision to a service connector 1020 based, for example, on a set of policy rules. In certain embodiments, the service connector 1020 provides a connection for communication of the results of the analytics operations from the endpoint agent 706 to the corresponding security service 716. As will be recognized in view of the teachings of the present disclosure, the business logic analytics/policy decisions module 1016 may be used to execute various analytics operations and/or implement various security policies, some of which may be initialized by the configuration engine 1006 based on configuration communications received from the endpoint core 702.

In certain embodiments, the endpoint agent 706 implements a command and control path, shown generally at 1022. As with the configuration information, the message bus 708 may include command and control information directed to multiple agents. Accordingly, certain embodiments filter command and control information specific to the particular endpoint agent 706 at the ingress filter 1004 so that only the intended endpoint agent 706 responds to the information. In certain embodiments, command and control information for the endpoint agent 706 is passed from the output of the ingress filter 1004 to an input of the agent manager 1014 for controlling the parameters of the service connector 1020 and/or business logic analytics/policy decisions module 1016. In certain embodiments, the parameters of the service connector 1020 and/or business logic analytics/policy decisions module 1016 may be dynamically updated during operation of the endpoint agent 706 by commands provided from the endpoint core 702 and/or other endpoint agents provided from the message bus 708 through the command and control path 1022.

Certain embodiments of the endpoint agent 706 implement an event handling path, shown generally at 1026. In certain embodiments, the endpoint agent 706 receives events from the message bus 708. In many instances, the events on the message bus 708 include events other than those that are to be processed by the endpoint agent 706. Accordingly, the event ingress filter 1018 is configured to pass only those events to which the endpoint agent 706 has subscribed. In certain embodiments, the subscribed events are provided to an input of the business logic analytics/policy decisions module 1016 for analytics processing. In certain embodiments, the results of the event processing by the business logic analytics/policy decisions module 1016 are passed to the input of the service connector 1020 for communication to the security service 716. In certain embodiments, the business logic analytics/policy decisions module 1016 may communicate with other endpoint agents 706 at an output 1026a of the event handling path 1026. In certain examples, operations executed on the subscribed events by the endpoint agent 706 may be pertinent to operations of other endpoint agents and corresponding services. In certain embodiments, communications between endpoint agents 706 may provide a platform in which computational power for event analysis may be more evenly distributed between the endpoint agents 706.

In certain embodiments, all of the subscribed events at the output of the event ingress filter 1018 may be passed directly to the service connector 1020 for communication to the security service 716. In certain embodiments, only a subset of the subscribed events are passed to the service connector 1020 through an egress filter 1030. In certain embodiments, the subset of subscribed events are passed to the service connector 1020 from the output of the egress filter 1030.

In certain embodiments, the command and control path 1022 may include an output path 1022a over which the business logic analytics/policy decisions module 1016 may communicate with the endpoint core 702 to request a subscription to certain events. In certain embodiments, the endpoint agent 706 receives reconfiguration and authorization for the subscription from the endpoint core 702 along the agent configuration path 1002. In certain embodiments, the configuration engine 1006 responds to the reconfiguration and authorization to change the event subscription parameters of the events ingress filter 1018.

Based on the teachings of the present disclosure, those skilled in the art will recognize that various other embodiments of the endpoint agent 706 may be implemented. Accordingly, the embodiment of the endpoint agent 706 shown and described in connection with FIG. 10 is for illustrative purposes and is not intended to describe all potential endpoint agent architectures that may be used in the unified endpoint system 310.

Figure 11:
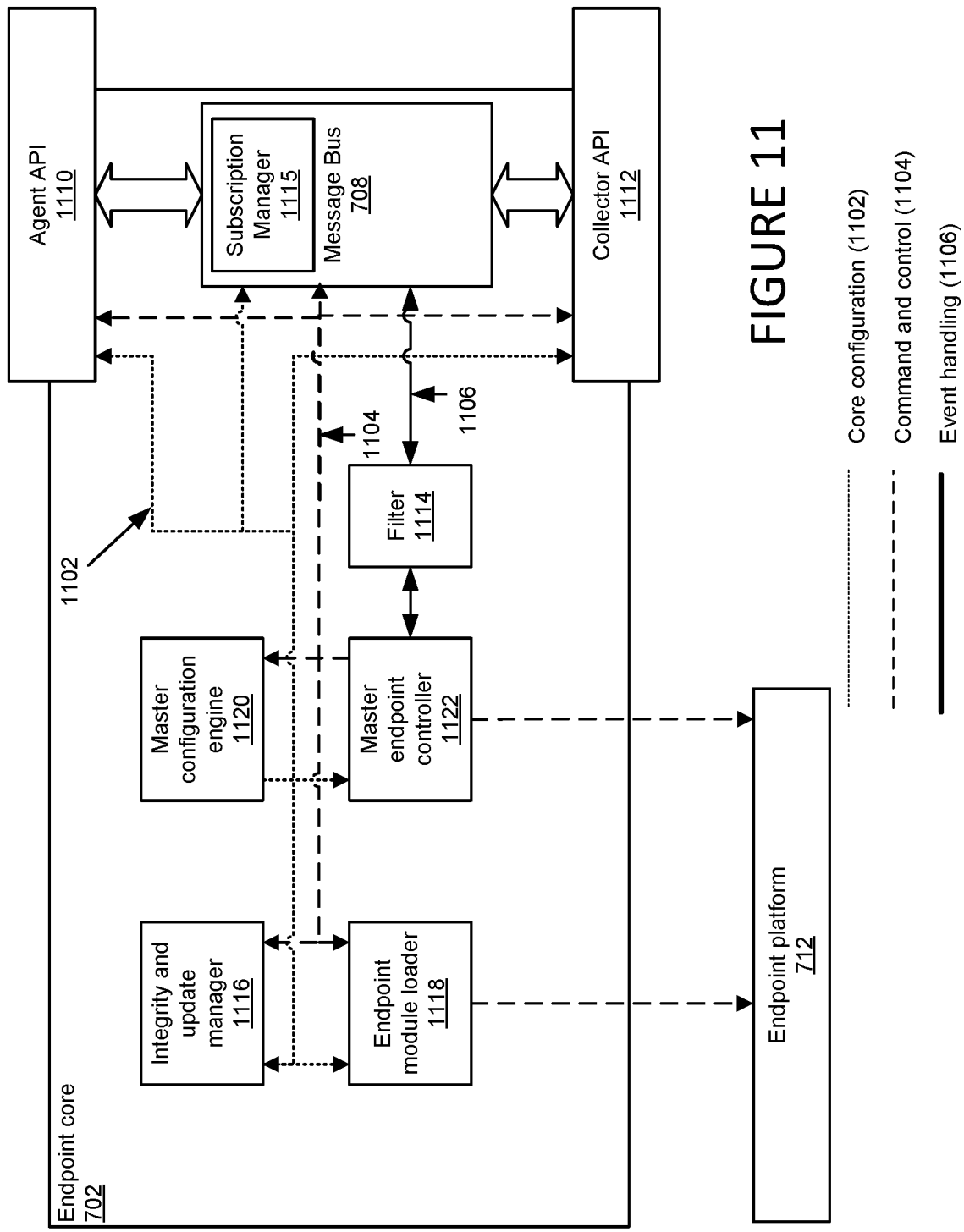
FIG. 11 is a simplified block diagram of one manner of implementing certain embodiments of an endpoint core of the unified endpoint system.

FIG. 11 is a simplified block diagram of one manner of implementing certain embodiments of an endpoint core 702 of the unified endpoint system 310. In certain embodiments, the endpoint core 702 includes multiple communication paths over which various types of information are transferred both internally and externally. In certain embodiments, the communication paths include a core configuration path (shown generally at 1102), a command and control path (shown generally at 1104), and an event handling path (shown generally at 1106).

As shown in the example of FIG. 11, the endpoint core 702 may include an endpoint agent API 1110 and an endpoint collector API 1112. In certain embodiments, the endpoint agent API 1110 and endpoint collector API 1112 allow the endpoint agents 706 and endpoint collectors 704 to communicate with one another over the message bus 708. In certain embodiments, the APIs 1110 and 1112 allow the endpoint core 702 to communicate configuration information to the endpoint collectors 704 and endpoint agents 706. In certain embodiments, the endpoint core 702 may communicate events relating to its own operation onto the event handling path 1106 for provision on the message bus 708. In certain embodiments, the endpoint core 702 may receive events that may be pertinent to its operation from the message bus 708 over the event handling path 1106. In certain embodiments, an event filter 1114 may be employed to ensure that only certain events are placed on the message bus 708 and received on the message bus 708. In certain embodiments, the information passing through the event filter 1114 may relate to performance of the unified endpoint system 310 as determined by the master endpoint controller 1122. In certain embodiments, information relating to the performance of the unified endpoint system 310 may be used to dynamically update parameters of the endpoint collectors and endpoint agents to prevent overutilization and underutilization of the unified endpoint system resources.

In certain embodiments, the endpoint core 702 provides subscriber management using a subscription manager 1115 to distribute subscribed events received from the endpoint collectors 704 to the endpoint agents 706. In certain embodiments, subscription management may be implemented via the command and control path 1022a of an endpoint agent 706. In certain embodiments, the endpoint core 702 provides management of the message bus. Such management may include, for example, management of work-items (i.e., memory-pool), queue management, and the thread-pool management. In certain embodiments, the endpoint core 702 interacts with collectors 704 to provide endpoint information services to the endpoint agents 706. Such information services may include process and DNS cache information.

Certain embodiments of the endpoint core 702 include various components that assist the endpoint core 702 to manage the endpoint platform, the endpoint collectors and the endpoint agents. Certain embodiments of the endpoint core include an integrity and update manager 1116. In certain embodiments, the integrity and update manager 1116 checks the integrity of the files that are loaded on the endpoint device 305 as well as to provide any updates to those files. In certain embodiments, the integrity and update manager 1116 may check the integrity of the files implementing the endpoint agents and collectors as well as to provide any updates to those files.

Certain embodiments of the endpoint core include a master configuration engine 1120, which identifies the endpoint agents and endpoint collectors that are to be installed in the unified endpoint system 310. Certain embodiments of the endpoint core 702 include an endpoint module loader 1118 which loads the operational modules onto the endpoint platform 712 during startup of the endpoint device 305. In certain embodiments, the endpoint module loader 1118 is also responsible for loading the endpoint agents and endpoint collectors used in the unified endpoint system 310. In certain embodiments, the endpoint module loader 1118 may be used to selectively load and/or unload the endpoint collectors 704 on demand.

Based on the teachings of the present disclosure, those skilled in the art will recognize that various other embodiments of the endpoint core 702 may be implemented. Accordingly, the embodiment of the endpoint core 702 shown and described connection with FIG. 11 is for illustrative purposes and is not intended to describe all potential endpoint core architectures that may be used in the unified endpoint system 310.

Figure 12:
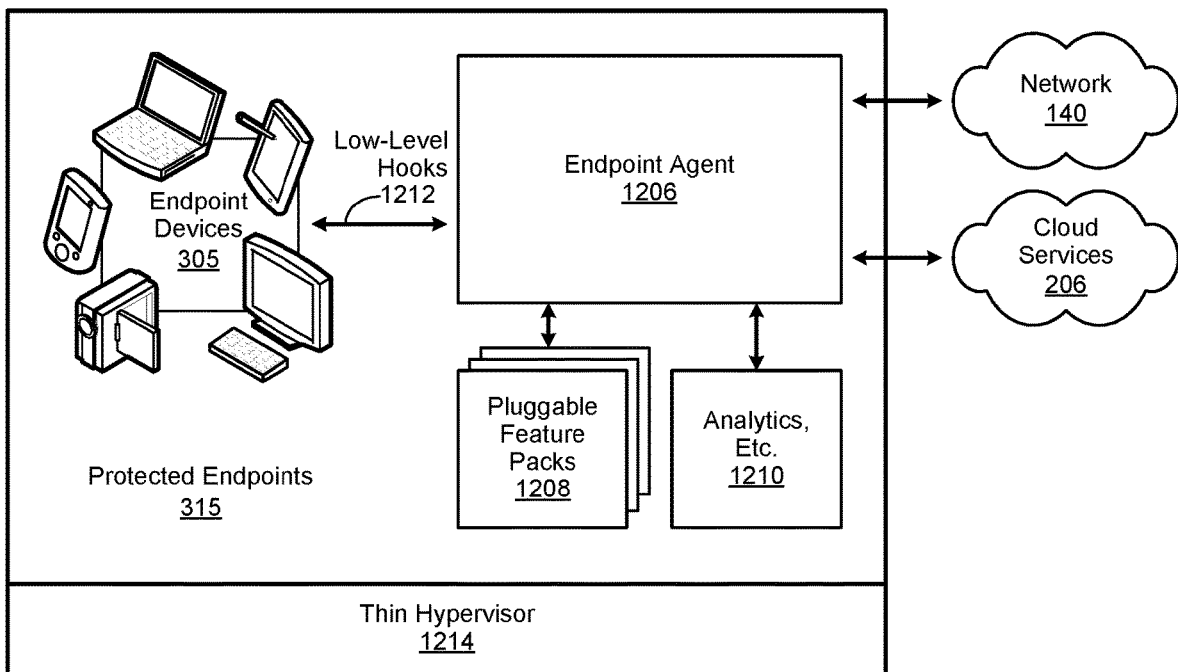
FIG. 12 depicts an electronic environment in which certain embodiments of various types of endpoint agents may operate.

FIG. 12 depicts an electronic environment in which certain embodiments of various types of endpoint agents 1206 may operate. In certain embodiments, the endpoint agent 1206 may be implemented to universally support a variety of operating systems, such as Apple Macintosh®, Microsoft Windows®, Linux®, Android® and so forth. In certain embodiments, the endpoint agent 1206 may be implemented to interact with the endpoint device 305 through the use of low-level hooks 1212 at the OS level. It will be appreciated that the use of low-level hooks 1212 allows the endpoint agent 1206 to subscribe to multiple events through a single hook. Consequently, multiple functionalities provided by the endpoint agent 1206 can share a single data stream, using only those portions of the data stream they may individually need. Accordingly, system efficiency can be improved and operational overhead reduced.

In certain embodiments, the endpoint agent 1206 may be implemented to provide a common infrastructure for pluggable feature packs 1208. In various embodiments, the pluggable feature packs 1208 may provide certain security management functionalities. Examples of such functionalities may include various anti-virus and malware detection, data loss protection (DLP), insider threat detection, and so forth. In certain embodiments, the security management functionalities may include one or more functionalities associated with detecting anomalous, abnormal, unexpected or malicious user behavior and adaptively responding to mitigate risk, as described in greater detail herein.

In certain embodiments, a particular pluggable feature pack 1208 may be invoked as needed by the endpoint agent 1206 to provide a given functionality. In certain embodiments, individual features of a particular pluggable feature pack 1208 are invoked as needed. It will be appreciated that the ability to invoke individual features of a pluggable feature pack 1208, without necessarily invoking all such features, will likely improve the operational efficiency of the endpoint agent 1206 while simultaneously reducing operational overhead. Accordingly, the endpoint agent 1206 can self-optimize in certain embodiments by using the common infrastructure and invoking only those pluggable components that are applicable or needed for a given user behavior.

In certain embodiments, the individual features of a pluggable feature pack 1208 may be invoked by the endpoint agent 1206 according to the occurrence of a particular user behavior, a particular event, or a combination thereof, as described in greater detail herein. In certain embodiments, the individual features of a pluggable feature pack 1208 may be invoked by the endpoint agent 1206 at a particular point in time. In these embodiments, the method by which a given user behavior, event, or point in time is selected to invoke the endpoint agent 1206 is a matter of design choice.

In certain embodiments, the individual features of a pluggable feature pack 1208 may be invoked by the endpoint agent 1206 according to the context of a particular user behavior. As an example, the context may be the user enacting the user behavior, their associated risk classification, which resource they may be requesting, the point in time the user behavior is enacted, and so forth. In certain embodiments, the pluggable feature packs 1208 may be sourced from various cloud services 206. In certain embodiments, the pluggable feature packs 308 may be dynamically sourced from various cloud services 206 by the endpoint agent 1206 on an as-need basis.

In certain embodiments, pluggable feature packs may be based on a unified API/SDK with well-defined event categories that are common to all of the plug-ins. In certain embodiments, such plug-ins may be included in the endpoint collectors 704, endpoint agents 706, and/or modules within the endpoint core 702. Such plug-ins may be designed for in-process and/or out-of-process activities.

In certain embodiments, the endpoint agent 1206 may be implemented with additional functionalities, such as event analytics 1210. In certain embodiments, the event analytics 1210 functionality may include analysis of various user behaviors, described in greater detail herein. In certain embodiments, the event analytics 1210 functionality may include analysis of a particular event. In certain embodiments, the particular event may be associated with one or more user behaviors. In certain embodiments, the event analytics 1210 functionality may include detecting anomalous, abnormal, unexpected or malicious user behavior and adaptively responding to mitigate risk, as described in greater detail herein.

In certain embodiments, the endpoint agent 1206 may be implemented with a thin hypervisor 1214, which can be run at Ring −1, thereby providing protection for the endpoint agent 1206 in the event of a breach. As used herein, a thin hypervisor broadly refers to a simplified, OS-dependent hypervisor implemented to increase security. As likewise used herein, Ring −1 broadly refers to approaches allowing guest operating systems to run Ring 0 (i.e., kernel) operations without affecting other guests or the host OS. Those of skill in the art will recognize that many such embodiments and examples are possible. Accordingly, the foregoing is not intended to limit the spirit, scope or intent of the invention.

As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention. Consequently, the invention is intended to be limited only by the spirit and scope of the appended claims, giving full cognizance to equivalents in all respects.

What is claimed is:

1. A computer-implemented method for operating an endpoint agent at an endpoint device, comprising:
providing the endpoint device with an endpoint agent, the endpoint device and the endpoint agent providing a protected endpoint, the endpoint agent comprising an endpoint core and one or more collectors, each collector comprising a configuration engine, a business logic analytics module communicating with the configuration engine, an ingress filter communicating with the business logic analytics module and an egress filter communicating with the business logic analytics module;

operating the endpoint agent to selectively subscribe, using the business logic analytics module and the ingress filter of the endpoint agent, to events corresponding to activities occurring at an endpoint platform, the ingress filter being configured by the configuration engine to pass through subscribed events for selective processing by the endpoint agent;

processing events received from a message bus by the endpoint agent using the business logic analytics module, wherein
 the events processed by the endpoint agent are events to which the endpoint agent has subscribed, and
 the business logic analytics module is configured to execute analytics operations on the events based on a set of policy rules for provision to a service corresponding only to the endpoint agent; and communicating, by the business logic analytics module, to the service corresponding to the endpoint agent, information corresponding to the events processed by the endpoint agent, wherein said communicating is performed using a service connector of the endpoint agent that provides a communication path to the service;

the endpoint core, endpoint agent, and one or more endpoint collectors cooperate with one another as resources of a unified endpoint system; and the endpoint core dynamically reconfigures at least one of the endpoint collectors and the endpoint agent during operation of the endpoint device to prevent at least one of overutilization and underutilization of the resources of the unified endpoint system.

2. The computer-implemented method of claim 1, further comprising:

operating a plurality of endpoint agents to selectively subscribe to events corresponding to activities occurring at an endpoint platform, wherein each of the plurality of endpoint agents selectively subscribes to one or more respective events using an associated business logic analytics module;

processing events received from a message bus by each of the plurality of endpoint agents using the associated business logic analytics module, wherein the events processed by a respective endpoint agent are events to which the respective endpoint agent has subscribed; and communicating information, using the associated business logic analytics module, corresponding to the events processed by respective endpoint agents to a service corresponding to each agent.

3. The computer-implemented method of claim 1, further comprising:

operating the endpoint agent to communicate over the message bus with the endpoint core to selectively subscribe to the events.

4. The computer-implemented method of claim 3, wherein operating the endpoint agent to communicate with the endpoint core using an Application Program Interface (API).

5. The computer-implemented method of claim 1, wherein the endpoint agent is configured to receive events over the message bus from the one or more endpoint collectors.

6. The computer-implemented method of claim 1, further comprising:

operating the endpoint agent to communicate events corresponding to activities occurring at the endpoint agent over the message bus.

7. The computer-implemented method of claim 1, further comprising:

operating the business logic analytics module associated with the endpoint agent to execute one or more operations including
 business logic operations based on subscribed events;
 analytics operations on subscribed events; and/or
 policy decision operations based on subscribed events.

8. A system comprising:

a processor;

a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for:

providing the endpoint device with an endpoint agent, the endpoint device and the endpoint agent providing a protected endpoint, the endpoint agent comprising an endpoint core and one or more collectors, each collector comprising a configuration engine, a business logic analytics module communicating with the configuration engine, an ingress filter communicating with the business logic analytics module and an egress filter communicating with the business logic analytics module;

operating an endpoint agent to selectively subscribe, using the business logic analytics module and the ingress filter of the endpoint agent, to events corresponding to activities occurring at an endpoint platform, the ingress filter being configured by the configuration engine to pass through subscribed events for selective processing by the endpoint agent;

processing events received from a message bus by the endpoint agent using the business logic analytics module, wherein
 the events processed by the endpoint agent are events to which the endpoint agent has subscribed,
 the business logic analytics module is configured to execute analytics operations on the events for provision to a service corresponding to the endpoint agent based on a set of policy rules; and communicating, by the business logic analytics module, to the service corresponding to the endpoint agent, information corresponding to the events processed by the endpoint agent, wherein said communicating is performed using a service connector that provides a communication path to the service;

the endpoint core, endpoint agent, and one or more endpoint collectors cooperate with one another as resources of a unified endpoint system; and the endpoint core dynamically reconfigures at least one of the endpoint collectors and the endpoint agent during operation of the endpoint device to prevent at least one of overutilization and underutilization of the resources of the unified endpoint system.

9. The system of claim 8, wherein the instructions are further configured for:

operating a plurality of endpoint agents to selectively subscribe to events corresponding to activities occurring at an endpoint platform, wherein each of the plurality of endpoint agents selectively subscribes to one or more respective events using an associated business logic analytics module;

processing events received from a message bus by each of the plurality of endpoint agents, wherein the events processed by a respective endpoint agent are events to which the respective endpoint agent has subscribed; and communicating information, using the associated business logic analytics module, corresponding to the events processed by respective endpoint agents to a service corresponding to each agent.

10. The system of claim 8, wherein the instructions are further configured for:

operating the endpoint agent to communicate over the message bus with the endpoint core to selectively subscribe to the events.

11. The system of claim 10, wherein the endpoint agent communicates with the endpoint core using an application program interface (API).

12. The system of claim 8, wherein the endpoint agent is configured to receive events over the message bus from the one or more endpoint collectors.

13. The system of claim 8, wherein the instructions are further configured for:

operating the endpoint agent to communicate events corresponding to activities occurring at the endpoint agent over the message bus.

14. The system of claim 8, wherein the instructions are further configured for:

operating the business logic analytics module associated with the endpoint agent to execute one or more operations including
business logic operations based on subscribed events;
analytics operations on subscribed events; and/or
policy decision operations based on subscribed events.

15. A non-transitory, computer-readable storage medium embodying computer program code, the computer program code comprising computer executable instructions configured for:

providing the endpoint device with an endpoint agent, the endpoint device and the endpoint agent providing a protected endpoint, the endpoint agent comprising an endpoint core and one or more collectors, each collector comprising a configuration engine, a business logic analytics module communicating with the configuration engine, an ingress filter communicating with the business logic analytics module and an egress filter communicating with the business logic analytics module;

operating an endpoint agent to selectively subscribe, using the business logic analytics module and the ingress filter of the endpoint agent, to events corresponding to activities occurring at an endpoint platform, the ingress filter being configured by the configuration engine to pass through subscribed events for selective processing by the endpoint agent;

processing events received from a message bus by the endpoint agent using the business logic analytics module, wherein the events processed by the endpoint agent are events to which the endpoint agent has subscribed, and the business logic analytics module is configured to execute analytics operations on the events for provision to a service corresponding to the endpoint agent based on a set of policy rules; and communicating, by the business logic analytics module, to the service corresponding to the endpoint agent, information corresponding to the events processed by the endpoint agent, wherein said communicating is performed using a service connector that provides a communication path to the service;

the endpoint core, endpoint agent, and one or more endpoint collectors cooperate with one another as resources of a unified endpoint system; and the endpoint core dynamically reconfigures at least one of the endpoint collectors and the endpoint agent during operation of the endpoint device to prevent at least one of overutilization and underutilization of the resources of the unified endpoint system.

16. The non-transitory, computer-readable storage medium of claim 15, wherein the instructions are further configured for:

operating a plurality of endpoint agents to selectively subscribe to events corresponding to activities occurring at an endpoint platform, wherein each of the plurality of endpoint agents selectively subscribes to one or more respective events using an associated business logic analytics module;

processing events received from a message bus by each of the plurality of endpoint agents using the associated business logic analytics module, wherein the events processed by a respective endpoint agent are events to which the respective endpoint agent has subscribed; and communicating information, using the associated business logic analytics module, corresponding to the events processed by respective endpoint agents to a service corresponding to each agent.

17. The non-transitory, computer-readable storage medium of claim 15, wherein the instructions are further configured for:

operating the endpoint agent to communicate over the message bus with the endpoint core to selectively subscribe to the events.

18. The non-transitory, computer-readable storage medium of claim 17, wherein the endpoint agent communicates with the endpoint core using an application program interface (API).

19. The non-transitory, computer-readable storage medium of claim 15, wherein the endpoint agent is configured to receive events over the message bus from the one or more endpoint collectors.

20. The non-transitory, computer-readable storage medium of claim 15, wherein the instructions are further configured for:

operating the endpoint agent to communicate events corresponding to activities occurring at the endpoint agent over the message bus.

\* \* \* \* \*